US012705819B2

(12) United States Patent
van Antwerpen et al.

(10) Patent No.: US 12,705,819 B2
(45) Date of Patent: Aug. 11, 2026

(54) RAY OFFSETTING FOR NUMERICAL IMPRECISION COMPENSATION IN CONTENT GENERATION SYSTEMS AND APPLICATIONS

(71) Applicant: Nvidia Corporation, Santa Clara, CA (US)

(72) Inventors: Dirk Gerrit van Antwerpen, Berlin (DE); Carsten Alexander Waechter, Berlin (DE); Oliver Klehm, Braunschweig (DE)

(73) Assignee: Nvidia Corporation, Santa Clara, CA (US)

( * ) Notice: Subject to any disclaimer, the term of this patent is extended or adjusted under 35 U.S.C. 154(b) by 351 days.

(21) Appl. No.: 18/597,392

(22) Filed: Mar. 6, 2024

(65) Prior Publication Data

US 2024/0371073 A1 Nov. 7, 2024

Related U.S. Application Data

(60) Provisional application No. 63/463,305, filed on May 2, 2023.

(51) Int. Cl.
*G06T 15/06* (2011.01)

(52) U.S. Cl.
CPC .......... *G06T 15/06* (2013.01); *G06T 2210/21* (2013.01)

(58) Field of Classification Search
CPC ............................ G06T 15/06; G06T 2210/21
See application file for complete search history.

(56) References Cited

U.S. PATENT DOCUMENTS

| | | | | |
|---|---|---|---|---|
| 2013/0176313 | A1* | 7/2013 | Gautron | G06T 15/50 345/426 |
| 2021/0358198 | A1* | 11/2021 | Pantaleoni | G06T 15/506 |
| 2022/0165016 | A1* | 5/2022 | Pantaleoni | G06T 15/506 |
| 2024/0029338 | A1* | 1/2024 | Wright | G06T 15/06 |

* cited by examiner

*Primary Examiner* — Phuc N Doan
(74) *Attorney, Agent, or Firm* — Hogan Lovells Cadwalader US LLP

(57) ABSTRACT

Approaches presented herein provide for the reduction in artifacts in image data rendered using ray or path tracing, such as may be due to self-intersections with scene geometry. In at least one embodiment, an appropriate offset value is automatically determined that is to be applied to the spawn point of a secondary ray to be traced, such as may correspond to a hit point of an incoming ray on scene geometry. In at least one embodiment, a single offset value can be calculated that accounts for all sources of numerical error in both construction of the spawn point and during ray traversal, including sources of error in both object space and world space. Once calculated, this single offset can be applied along a normal of a scene geometry, so that any ray traced from a shifted spawn point will not self-intersect the triangle, even for edge or corner cases.

20 Claims, 18 Drawing Sheets

500

502 Trace a first ray for an image of a scene to be rendered

504 Determine a hit point where the first ray intersects scene geometry

506 Determine that a second ray is to be traced from the hit point (for a surface interaction)

508 Calculate an offset distance for the second ray based in part on two or more sources of numerical imprecision 510 Set a spawn point for the second ray at the offset distance from the hit point, along a normal of the scene geometry 512 Trace the second ray from the spawn point 514 More rays?

No

Yes

516 Provide information corresponding to traced rays for use in rendering the image of the scene

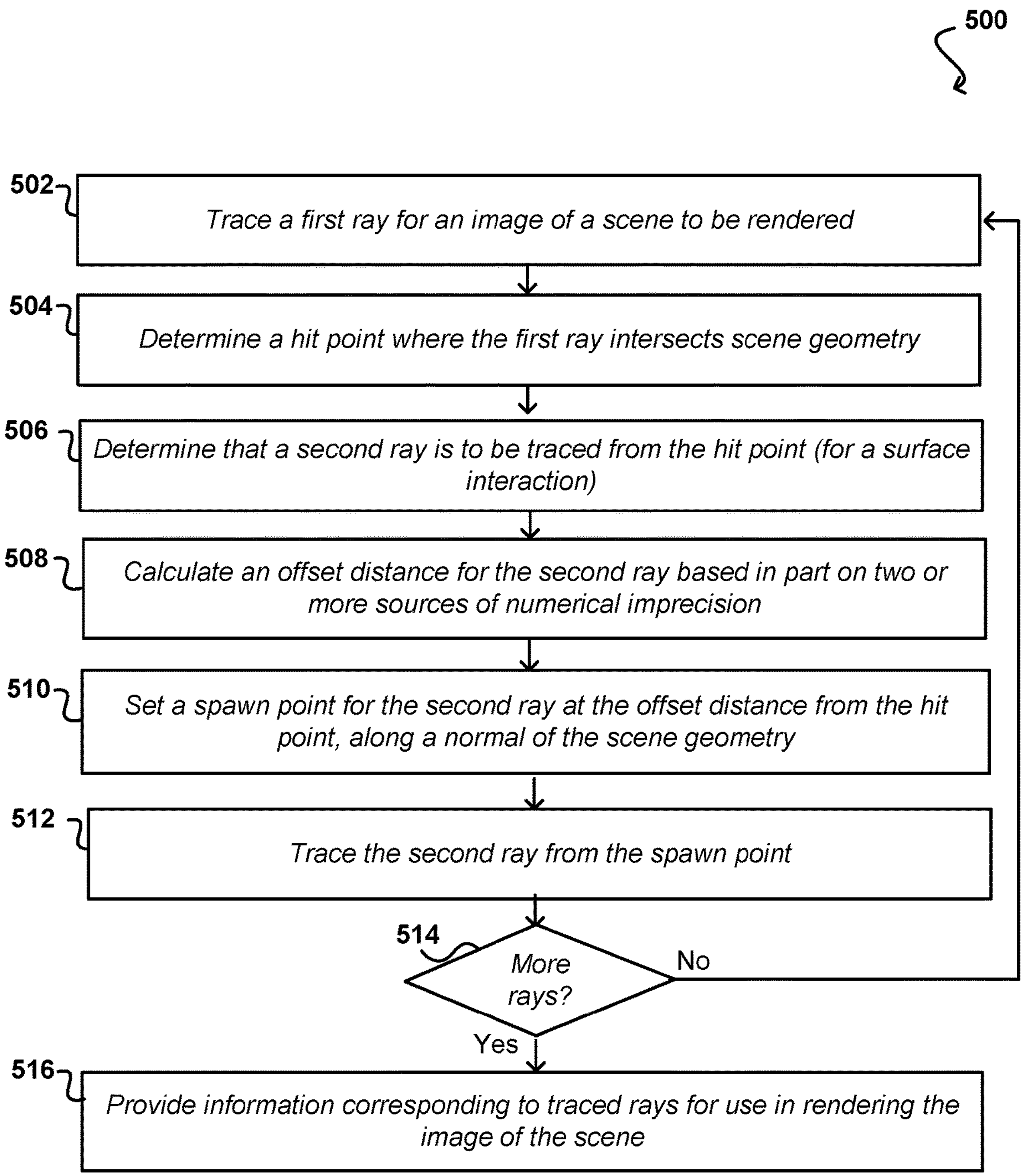

FIG. 5A

RAY OFFSETTING FOR NUMERICAL IMPRECISION COMPENSATION IN CONTENT GENERATION SYSTEMS AND APPLICATIONS

CROSS-REFERENCE TO RELATED APPLICATIONS

This application claims priority to U.S. Provisional Patent Application Ser. No. 63/463,305, filed May 2, 2023, and entitled "Robust Ray Offsetting," which is hereby incorporated herein in its entirety and for all purposes.

BACKGROUND

In various content generation applications—such as for gaming, animation, or virtual reality content generation, for example—it can be desirable to generate image content that is of high perceptual quality when displayed or presented. In many situations, the quality will be limited to some extent by the limitations of the display mechanism, such as the number or size of pixels used to generate the display. Systems also typically limit the precision with which mathematical calculations are performed, or with which values are represented, due in part to the inability to adequately represent sub-pixel features. Storing a large set of numbers in high precision can require a significant amount of resources, and in many instances the value of that high precision will be minimal at best with respect to the quality of the final displayed image. There are situations, however, where image artifacts can arise from the use of lower precision, where numbers are rounded to the closest value with this lower, target precision. As an example, a ray tracing algorithm might trace a first ray that is determined to intersect with, or "hit," the surface of an object at a specific location. If there is a surface interaction—such as may correspond to a reflection or refraction of an incoming light ray at a surface—a second ray can then be traced from the location of that intersection or hit point. Due to the rounding error, lower/finite precision of the position information, or floating point operations in the hardware, however, it is possible that the secondary ray will intersect that same surface again, which can result in improper color information being used for the corresponding pixel location. These "self-intersections" can result in undesirable visible image artifacts in the resulting rendered image data.

BRIEF DESCRIPTION OF THE DRAWINGS

Various embodiments in accordance with the present disclosure will be described with reference to the drawings, in which:

FIGS. 5A and 5B illustrate example processes for determining and applying offset values to spawn points for secondary rays, according to at least one embodiment;

DETAILED DESCRIPTION

Figure 1A:
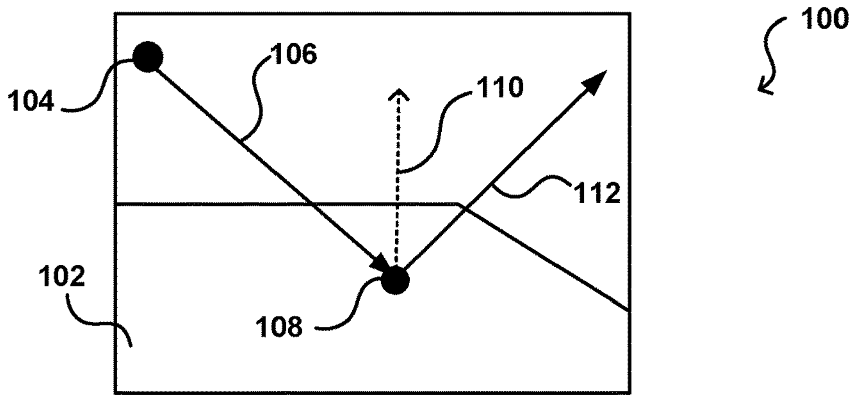
FIGS. 1A-1C illustrate sample ray paths for incoming and secondary rays, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, generative AI with large language models (LLMs), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations using LLMs, systems for performing light transport simulation, systems for performing collaborative content creation for 3D assets, systems implemented at least partially using cloud computing resources, and/or other types of systems.

Approaches in accordance with various illustrative embodiments provide for the reduction of artifacts in rendered images. In particular, various embodiments can attempt to reduce or eliminate the presence of image artifacts resulting from self-intersections in rendering operations, such as those that use ray and/or path tracing algorithms. In at least one embodiment, an approach to ray tracing attempts to automatically determine appropriate offset values to be applied to the origins (or spawn points) of secondary rays to be traced from ray hit points on scene geometry, where these secondary rays may be due in part to surface interactions (e.g., reflections or refractions) of a first or incoming ray intersecting the scene geometry at those hit points. By offsetting the origin of a secondary ray from the imprecise hit point location, that secondary ray can be traced from a spawn point that will be positioned at a sufficient distance from the scene geometry to account for any differences due at least in part to numerical imprecision. For example, there may be some error in the computed hit-distance along the ray due to rounding or limited precision in the distance determination. There may also be some error that is proportional in the length of a connection ray. Such an offset can account for any error in the spawn-point reconstruction and the subsequent traversal of the secondary ray. A mathematical approach is used to calculate a single overall offset to be applied to a secondary ray, including those errors that may be introduced before and/or after the offset is applied. In at least one embodiment, a single offset value can be calculated that accounts for all sources of numerical error in both construction of the spawn point and during ray traversal, including sources of error in both object space and world space. Once calculated, this single offset can be applied along a normal of a triangle, or other element of scene geometry, so that a ray traced from a shifted spawn point will not self-intersect the triangle, even for edge or corner cases. In one embodiment, the error includes three error components in object space and one error component in world space. An example set of error components includes an object-space primitive intersection error, as well as a world space error bound on an object-to-world space transformation (before traversal), an object-space hit point reconstruction error, and a world-to-object space transformation error. Hit point reconstruction error (or imprecision) can be addressed that is due to interpolation of, for example, a ray or one or more vertices of the triangle. Once calculated, the offset can be applied to a world-space secondary ray origin in a positive or a negative direction, corresponding to a reflection or refraction from the triangle, for example, and can be applied to other secondary rays (such as shadow rays) to be spawned for the same hit point. The application of the offset to the connection ray direction can be used specifically for connection rays, such as shadow rays, to also prevent self-intersection at the opposite end of the connection ray. After applying the regular offset to the origin of the connection ray, another independent offset can be computed for the endpoint of the connection ray—in a very similar manner as for the secondary ray origin—and this offset can be applied to the connection ray direction.

Variations of this and other such functionality can be used as well within the scope of the various embodiments as would be apparent to one of ordinary skill in the art in light of the teachings and suggestions contained herein.

As mentioned, various approaches to rendering image content—including not only static image data but also video, virtual reality (VR)/augmented reality (AR)/enhanced reality (ER), holographic, and other such image-based or image-inclusive content—can utilize approaches such as ray tracing or path tracing to determine values, such as the appropriate color values, for specific pixels or other regions or points of the generated content. An example of the use of a ray tracing algorithm is illustrated in the view 100 of FIG. 1A. For simplicity of explanation the disclosure will use ray tracing as a primary example, but it should be understood that other types of tracing algorithms—such as path tracing or particle tracing algorithms—can be used as well within the scope of the various embodiments unless otherwise specifically stated. In this example, a ray tracing algorithm can "cast" a number of rays starting from a virtual camera or at least one light source in a scene. In FIG. 1A, this first ray 106 is shown to originate from a cast point 104 (here corresponding to the position of a virtual camera or light source) in a determined direction. A ray tracing algorithm will typically cast a number of rays in different directions from this position in order to provide a realistic sampling of light from a light source, or to a camera, such as may be appropriate for the resolution of the camera. In this example, the first cast ray 106 is determined to intersect with scene geometry 102. Here, the scene geometry is the surface of a table, as may be represented by a triangular mesh or other such geometry. Although illustrated in two dimensions, it should be understood that the scene geometry can be represented in three dimensions within a three-dimensional environment, such as a portion of an environment corresponding to a scene to be represented in a generated image. In this example, the surface of the table is at least partially reflective, as may be specified by one or more material properties associated with the surface of the table (or other region or texture) corresponding to the intersection point 108 of the first ray with the scene geometry. In order to account for a realistic reflection, a second ray 112 (sometimes referred to as a secondary ray) can be traced from the intersection point 108 in a direction that, for perfect reflections is "equal and opposite" to that of the incoming first ray 106, essentially mirroring the direction of the incoming ray with respect to a normal 110 of the surface of the scene geometry 102 at the intersection point. Other types of reflections, such as diffuse or glossy reflections, may occur as well, where rays may be scattered in random directions as may be based on a scattering distribution function, and where multiple secondary rays may be traced from a given intersection point. Here, the magnitude or intensity of the second ray 112 will likely be less than that of the first ray (unless the surface is a perfect reflector) due to aspects such as absorption or scattering of light due to the material properties of the surface of the scene geometry at the intersection point 108. Other aspects, such as the color, of the second ray 112 may be impacted by the material properties of the surface of the scene geometry 102 at the intersection point 108 as well. Although a reflection is illustrated, other second rays corresponding to other surface interactions, such as refractions, transmissions, or diffractions, for example, may be represented as well within the scope of various embodiments.

Figure 1B:
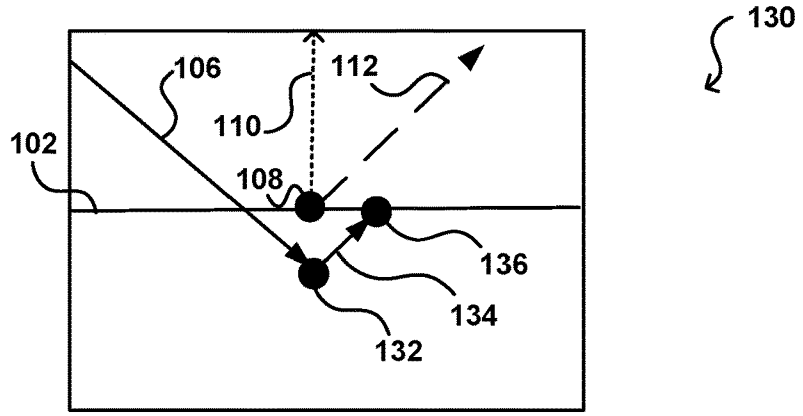

As illustrated, such a tracing algorithm can attempt to construct light paths by starting at a camera or a light source and intersecting cast rays with the relevant scene geometry, such as geometry that will be visible in a rendered image or is within a determined distance of such visible geometry. As objects are hit by these cast rays, one or more additional (e.g., secondary) rays can be generated on/from these surfaces in order to continue the paths. In theory, a second ray 112 cast from an intersection point 108 on a surface that was intersected by a first ray 106 will not yield another intersection with that same surface, as intersections at a distance of zero from the cast point are excluded by the intersection. In practice, however, the limited precision—such as finite floating-point precision—used in the actual implementation can lead to false positive results, often referred to as "self-intersections." As illustrated in the example view 130 of FIG. 1B, an intersection of a first ray 106 with a surface of the scene geometry 102 can be identified, but due to the limited precision the rounded position value may correspond to an "intersection" point 132 that is actually some non-zero distance away from the surface. It should be understood that reference numbers may be carried over between figures for similar elements for ease of explanation and understanding, but such usage should not be interpreted as a limitation on the scope of the various embodiments unless otherwise specifically stated. When tracing a second ray due to a reflection from the surface in this example, the second ray 112 would theoretically start from an intersection point 108 that lies along the intersected surface. Due to the limited precision in the position of the intersection point 132, however, the second ray 134 will actually start from a position that is a slight distance away from the surface. As illustrated, this second ray 134 which is cast from a point "on the other side" of the surface, might then be determined to intersect the surface again at a second intersection point 136. The use of information—such as material properties—from this second intersection point 136 with the same surface, or self-intersection point, can result in incorrect color or other values being determined for that ray, or set of rays. Further, the system may then attempt another reflection from this second intersection point 136 which would then propagate down in the figure, which may result in even less accurate color or pixel value determination. The occurrence of improper self-intersections can result in various artifacts in image data generated using the results of the tracing algorithm. One type of artifact that can be present in the rendered image is a shadow acne artifact, for example, where a surface can appear to improperly shadow itself. Self-intersections may also occur in other instances as well, such as at the endpoint of visibility rays when connecting shading points to light sources. It should be noted that endpoint visibility rays may occur when the light source itself is a geometric shape or surface, similar to other geometry in a scene. A cast point 104 may thus correspond to a point on the surface of an area light source, and not be limited to a single point light source.

Figure 1C:
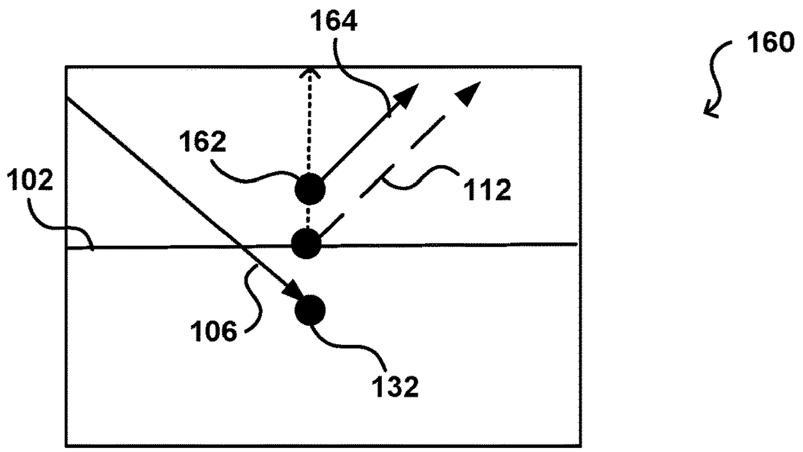

Approaches in accordance with at least one embodiment can attempt to avoid, or at least minimize, the occurrence of self-intersections and other such precision-related issues through use of robust offsetting. An example of one such offsetting approach is illustrated in the view 160 of FIG. 1C. As was discussed with respect to FIG. 1B, a first ray 106 can be determined to intersect a surface of an object—or other scene geometry 102—but due in part to the limited precision of the position data the determined intersection point 132 will be offset from the actual surface by some distance, as may correspond to a rounding error due to the limited precision. If a second ray were to be traced from this offset intersection point 132, a self-intersection might occur as discussed with respect to FIG. 1B. In this example approach, however, an offset can be determined such that a second ray 164 will be cast from an offset intersection point 162, or spawn point. The location of the offset intersection point 162 can be determined such that it will account for any error in precision of the location data with respect to the surface. In FIG. 1C, this can correspond to an offset intersection point 162 that is far enough away from the determined (imprecise) intersection point 132 to avoid a self-intersection, but also close enough to an ideal intersection point on the surface such that the second ray 164 will be relatively close in space to a theoretical second ray 112 if it were cast from an intersection point on the surface. Small offsets between the theoretical ray 112 and the actual second ray 164 will often result in small errors in color value that may not be noticeable in the final rendered image in many instances, or will likely at least result in more accurate pixel values than would have been determined from a self-intersection, and will likely avoid the occurrence of noticeable shadow acne or other such image artifacts.

As discussed, a first, incoming ray can be traced that can intersect scene geometry, such as a triangle, at a determined hit point. In the event of a surface interaction, for example, a secondary ray can be traced that coincides with, or spawns from, the hit point on the intersected triangle. In order to make the lighting appear as physically realistic as possible, as well as to avoid various image artifacts, an attempt can be made to compute a spawn point reasonably close to the hit point in the triangle plane. A spawn point that is too close to the triangle may result in self-intersection artifacts, but a spawn point that is too far away from the triangle may push the spawn point past nearby geometry, causing light leaking artifacts. A single offset determination approach may not be sufficient, however, as there may be other factors that may impact self-intersection type artifacts as well. For example, the offset needed near the edge of a triangle may need to be larger, as the adjacent triangles of an object may not be co-planar, and a small offset that might be sufficient in the center of the triangle might not be sufficient to avoid a self-intersection near the edge of that triangle.

Figure 2A:
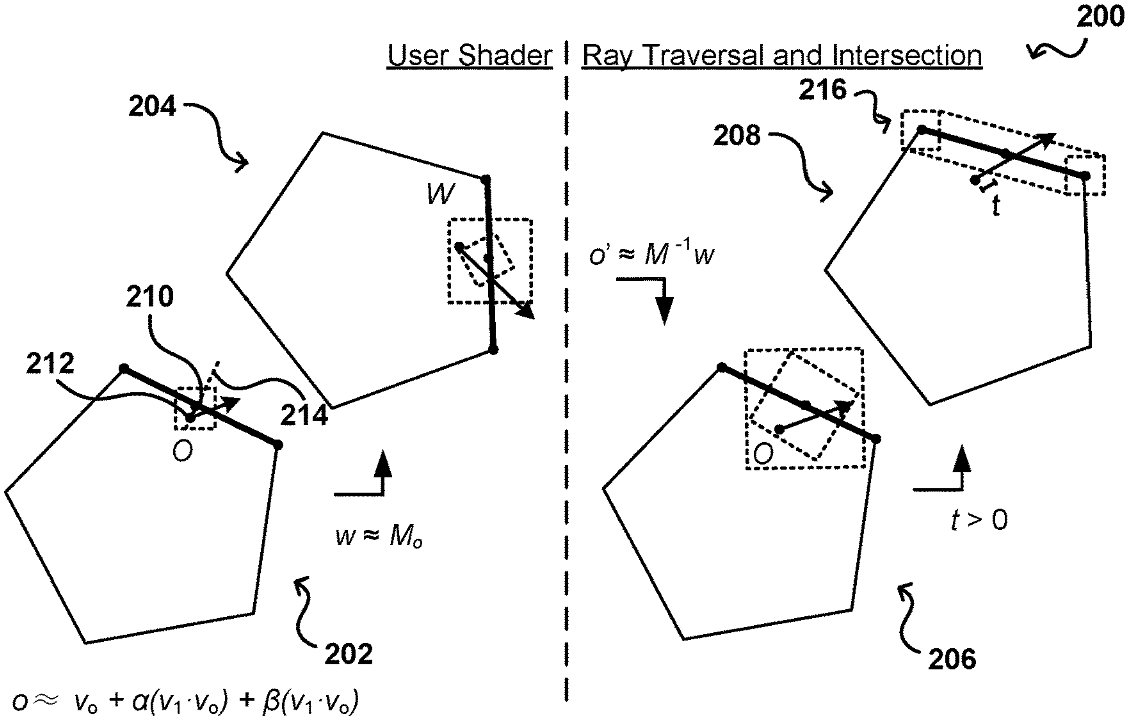
FIGS. 2A-2C illustrate sources of error for a traced ray and an offset that can be determined based on those sources of error, according to at least one embodiment.

FIG. 2A illustrates example sources 200 of numerical error that can be accounted for in at least one embodiment. This example includes both sources of error occurring in a user shader (left) as well as in ray tracing hardware or equivalent software in a ray traversal and intersection process. In a user shader, the object-space hit point 202 can be reconstructed and then transformed into a hit point 204 in world-space. During ray traversal, the world-space ray is transformed back into object-space 206 and intersected against triangles 208. Each of these operations can accumulate numerical errors, which may then result in self-intersections. Approaches in accordance with at least one embodiment can attempt to determine an offset that accounts for any and/or all of these errors. In at least one embodiment, an offset determination approach can involve computing a minimal uncertainty interval centered around the intended ray origin 210 on the triangle at each operation. The approximate ray origin 212 will lie within this uncertainty interval. The ray origin 212 is offset along the triangle normal 214 beyond the final uncertainty interval to prevent self-intersections. As illustrated, each error or uncertainty builds on the previous error or uncertainty, so in order to determine a proper offset 216 to avoid self-intersections it can be beneficial to first determine the total uncertainty.

In at least one embodiment, a robust offsetting method can be applied to secondary rays spawned from scene geometry, such as triangles of a triangular object mesh. Such approaches can be based in part on a thorough numerical analysis of various sources of numerical imprecision. The analysis can be used to compute the locations to use as spawn points for secondary rays, which can have a low probability of the occurrence of self-intersections. Such an approach does not require modification of any traversal or ray/surface intersection routines, and can thus be used with closed source and hardware-accelerated ray tracing interfaces, such as application programming interfaces (APIs) including DirectX Raytracing (DXR) and OptiX. Such approaches also do not rely on self-intersection rejection, such as may require use of an appropriate shader, and can incur a fixed overhead per shading point. In at least one embodiment, a safe offset value can be computed that accounts for multiple (and in at least some instances all) sources of numerical error in the construction of the spawn point, and as well as during ray traversal on rendering hardware. Applying such a safe offset to a spawn point along a surface normal, before traversal, can prevent self-intersection during traversal for rays originating from arbitrary triangles and with arbitrary invertible transformation matrices, as well as those rays optionally connecting to points on other arbitrary triangles and with other arbitrary (or invertible) transformation matrices.

In at least one embodiment, triangle (or other geometric) vertices can be used to compute an object-space error bound on a ray-triangle intersection test and the barycentric interpolation of the spawn-point. An object-to-world transformation matrix can then be used to compute a world-space error bound on the object-to-world transformation of the spawn point before traversal. A world-to-object transformation matrix can also be used to compute an object-space error bound on the world-to-object traversal transformation. These calculated error bounds can then be combined into a single offset along the world-space normal with respect to the intersected surface. In at least one embodiment, such an approach can also be used to compute a similar safe offset for the endpoint of a connection ray. Applying such an offset to a world-space connection ray direction can prevent self-intersections at the endpoint.

As mentioned, in at least one embodiment, the spawn point of a secondary ray can coincide with the hit point on a triangle of a first, or incoming, ray. Referring again to FIG. 2A, an offset determination process can be used to attempt to compute a spawn point as close as possible to the hit point in the triangle plane, while still avoiding self-intersections. In at least one embodiment, such a process can begin by reconstructing the hit point and the geometric triangle normal in object-space hit point 202. The hit point can be computed by, for example, interpolating the triangle vertices $v_0$, $v_1$, and $v_2$ using the two-dimensional (2D) barycentric hit coordinates barys. Although the interpolated hit point could be computed using two fused multiply-add operations, in this example, the base vertex $v_0$ is added last. Such ordering can help to reduce the maximum rounding error on the base vertex, which in practice has been observed to frequently dominate the rounding error in this computation. The object-space position can then be transformed to world-space 204. Instead of using matrix multiplication intrinsics provided by the shading API, such as the mul intrinsic in the high-level shader language (HLSL), which have implementation-dependent precision, the transformation can be determined explicitly in order to ensure that the translational part $m_{i3}$ of the transformation is added last. Such an approach can help to reduce the rounding error on the translation, which has been observed to frequently dominate the error in this computation. The object-space normal can then be transformed to world-space and normalized. In at least one embodiment, such a process does not normalize the object-space normal before the transformation, as normalization would need to be performed again in world-space anyway. The inverse length of the world normal can be used later in the process to appropriately scale the error bounds, so normalization can be performed explicitly rather than using, for example, the HLSL normalize intrinsic.

In at least one embodiment, a world-space hit point could also be computed by advancing an incoming ray by its hit distance. While such an approach does not require the triangle vertices or the object-to-world transformation, the error in the computed hit point may be unacceptably large. Furthermore, the triangle vertices will generally be used to compute the surface normal and compute bounds on the rounding errors, as discussed in more detail elsewhere herein. Operations that are concerned with precision may advantageously use an approach such as barycentric interpolation in at least one potential implementation.

Once an approximate world-space position and surface normal are determined, this example process can continue by computing error bounds on the computed position, bounding the maximum finite precision rounding error. It can be beneficial to account for rounding errors in the computations discussed previously, as well as rounding errors that may occur during traversal. During traversal, a world-to-object transformation 206 can be applied and a ray-triangle intersection test performed 208, both in finite precision which can introduce additional rounding errors. In at least one embodiment, a combined object-space error bound can be computed that accounts both for the rounding errors in reconstructing an object-space triangle hit point and rounding errors due to the ray-triangle intersection test. It can be noted that the error on the triangle intersection can be bounded by an amount that is proportional to the maximum triangle extent (according to an implementation-dependent constant scaling factor) along the three dimensions. In an intuitive justification, various ray-triangle intersection algorithms reorient the triangle into "ray space" by subtracting the ray origin, before performing the intersection test. In the context of self-intersection, the ray origin lies on the triangle. The magnitude of the remaining triangle vertices in this ray space is then bounded by the extent of the triangle along each dimension. Such algorithms typically also project the triangle into a 2D plane, and this projection can cause error along one dimension to bleed over into the other dimensions. Accordingly, the maximum extent can be taken along all dimensions, instead of treating the error along the dimensions independently. In at least one embodiment, the exact bound on the ray-triangle intersection test may be hardware specific, so one or more constants used may require some tuning on different platforms. Error bounds for custom intersection primitives may depend at least in part on the implementation details of the respective intersection shader. An approach in accordance with at least one embodiment can compute the world-space error bound due to the transformation of the hit point from object-space to world-space. Like the ray-triangle intersection test, the rounding error in the world-to-object transformation can depend at least in part on the hardware.

Figure 2B:
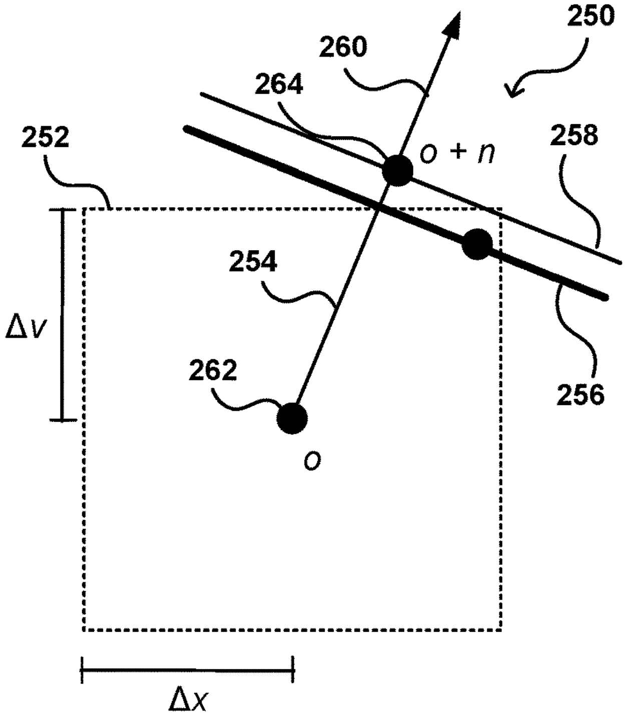

FIG. 2B illustrates an example offsetting approach 250 that can be used in accordance with at least one embodiment.

In this example, self-intersection can be avoided by offsetting the origin 262 for a ray 254 along the normal to a distance 258 outside the error interval 252. As discussed, bounds can be computed on the rounding errors for secondary ray construction and traversal. These bounds can provide an interval around the approximate, finite precision ray origin. The intended, full-precision "true" ray origin (with near infinite precision and accuracy) can be guaranteed to lie somewhere in this interval. The "true" surface will pass through this true ray origin, so the true surface will also pass through this interval. The approach 250 illustrated in FIG. 2B demonstrates one example to offsetting the approximate origin 264 from the determined origin 262 along the surface normal 260, to guarantee that the approximate origin 264 after the offsetting lies "above" the true surface 256, thus preventing self-intersections with the true surface 256 due to secondary rays cast from the approximate and offset origin 264. The error bound Δ can be projected onto the normal n to obtain an offset δ along the normal, as may be given by:

$$\delta = \frac{\Delta \cdot \text{abs}(n)}{n \cdot n}$$

It should be noted that the offset computed here is a scaler on the normal, not an absolute length along the normal. This matters when the normal is not unit length.

In at least one embodiment, errors in the computation and transformation of the normal can be ignored. Rounding errors on the normal are of similar magnitude as rounding errors on the computation of the error bounds and offset themselves. These are vanishingly small and can be ignored in at least some instances. In at least one embodiment, the object and world-space offsets can be combined into a single world-space offset along the world-space normal. For example, the normalized world-space normal $\bar{n}_\omega$ can be used, such that the world-space offset $\delta_\omega$ simplifies to:

$$\delta_\omega = \Delta \cdot \text{abs}(\bar{n}_\omega)$$

Similarly, the object-space offset $\delta_o$ along the object-space normal $n_o$ can be transformed into world-space as $\delta_o M n_o$. It can be noted, however, that the transformed object-space offset is not necessarily parallel to the world-space normal $n_\omega$. To obtain a single combined offset along the world-space normal, the transformed object-space offset can be projected onto the world-space normal, as $\delta_o M n_o \cdot n_\omega$. Using that $$n_\omega = M^{-T} n_o$$

this simplifies to $$\delta_o M n_o \cdot M^{-T} n_o = \delta_o (M n_o)^T M^{-T} n_o = \delta_o n_o \cdot M^T M^{-T} n_o = \delta_o n_o \cdot n_o = \Delta \cdot \text{abs}(n)$$

The computed offset can then be used to perturb the hit point 262 along the surface normal 260, which can provide a front spawn point 264, as well as potentially a back spawn point, that are both safe from self-intersection. The derived error bounds, and thus offsets, neither depend on the incoming ray direction nor the outgoing secondary ray direction. The same spawn points can then be reused for all secondary rays originating from this hit point. In at least one embodiment, reflection rays can use the front spawn point while transmission rays can use the back spawn point. In at least one embodiment, small rounding errors in the ray direction can be ignored. It can be noted that at extreme grazing angles, rounding errors in the world-to-object transformation of the direction may cause it to flip sides, orienting back towards the triangle. At least some offsetting approaches may not protect against such rounding errors, such that it may be beneficial in at least some instances to filter out secondary rays at extreme angles. Alternatively, similar error bounds can be derived on the ray direction transformation. Offsetting the ray direction along the surface normal as done for the ray origin can then guarantee its sidedness. However, as the reflectance distribution of common BRDF models tends towards zero at grazing angles, this problem can in many applications safely be ignored in at least some embodiments.

Figure 2C:
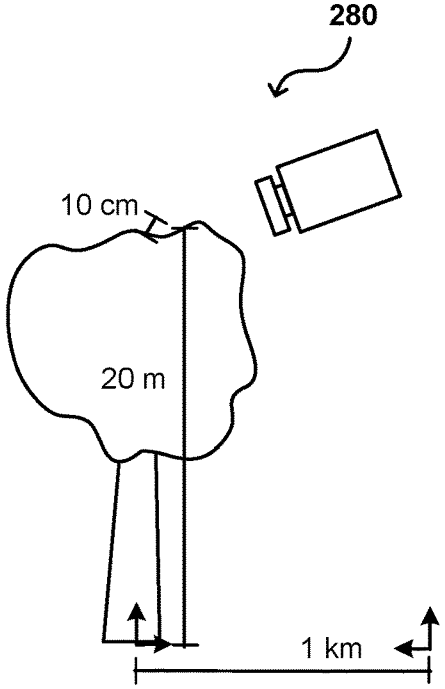

In at least one embodiment, a calculated offset can grow linearly in the triangle extent and the magnitude of the triangle base vertex in object-space. For small triangles, the rounding error in the base vertex can dominate the object-space error. The object-space error can therefore be reduced by repositioning geometry in object-space, centering the geometry around the object-space origin so as to minimize the distance to the origin. For geometry with extremely large triangles, such as ground planes, it may be worthwhile to tessellate the geometry and further reduce the rounding errors in the triangle extent. As illustrated in the example view 280 of FIG. 2C, offset magnitudes scale linearly with the triangle extent, object-space position, and world-space position magnitudes. For an example secondary ray spawned on a 10 cm extent leaf, in a 20 m tall tree (with the object-space origin at the root) that is 1 km away from the world space origin, the offset magnitudes due to the triangle extent, object-space position, and world-space position will be in the order of 45 nm, 4 μm and 0.25 mm, respectively. It has been observed that the offset due to world-space position tends to dominate in practice. It should be noted that the offset magnitude is independent of the relative camera position in this example.

It can also be noted that the rounding errors in the world-space position tend to dominate all rounding errors in practice as well. This can be particularly true for large scenes of relatively small objects. The magnitude of the offset will grow linearly with the magnitudes of the world-space position. The proportionality constant $c_2$ is approximately 1 ulps. Instanced geometry at a distance d from the scene origin in world-space will have a maximum rounding error in the order of $d2^{-22}$, or 1 mm of offset for every 4 km distance. It can be noted that d is the distance to the scene origin, not the scene camera. Consequently, if the camera is far away from the scene origin, the offsets for rays spawned from nearby geometry may become prohibitively large, resulting in visual artifacts.

In at least one embodiment, this problem can be reduced be translating the entire scene into camera space. All instances can be repositioned so the camera origin coincides with the world-space origin. Consequently, the distance d becomes the distance to the camera in this camera space and the offset magnitudes will be proportional to the distance to the camera. Rays spawned from geometry near the camera will enjoy relatively small offsets, reducing the likelihood of visual artifacts due to offsetting.

As discussed, a ray origin can be offset to prevent self-intersection at, or near, that origin. Ray and path tracing algorithms can also trace rays to evaluate visibility between two points on different triangles. This can include tracing rays such as shadow rays connecting a shading point and a light source. These rays may suffer from self-intersection on either end of the ray. To avoid self-intersections, both ends of a ray can be offset. The offset for an endpoint can be computed is a similar fashion as for the ray origin, but using the object-to-world and world-to-object transformation matrices, barycentrics, and triangle vertices of the endpoint, and using the connection ray direction as the incoming ray direction. Contrary to scattering rays, it can be appropriate to account for rounding errors in the world-to-object ray direction transform during traversal. Instead of offsetting the endpoint and recomputing the ray direction, the offset can be applied directly to the world-space direction. The ray length can also be shortened by one ulp to account for rounding errors in the direction computation. Alternatively, identifier-based self-intersection rejection is often sufficient to avoid endpoint self-intersection.

As mentioned, there are other approaches that can be used to attempt to avoid self-intersection and other such artifacts, but at least some of these approaches come with various deficiencies. For example, it is possible to simply exclude the triangle intersected by an incoming ray from the hit testing of a corresponding secondary ray, but such an approach requires tracking the current triangle in addition to the instance, and such an approach is not robust at the edges of triangles. Further, there may be a planar surface (at least locally) made up of a plurality of mostly parallel triangles, and if testing is performed based on the indexing of the triangle the same issue may be experienced with respect to a neighboring triangle. Such an approach can also be performance costly, as for every triangle the process has to perform an identity test, which in ray tracing APIs such as DXR and OptiX involves the invocation of user code (e.g., an AnyHit shader). Another example approach attempted to determine a universal offset experimentally, but such an approach is not robust and does not scale. Other approaches to estimating an appropriate offset do not address instancing, or come with various other defects.

Figure 3:
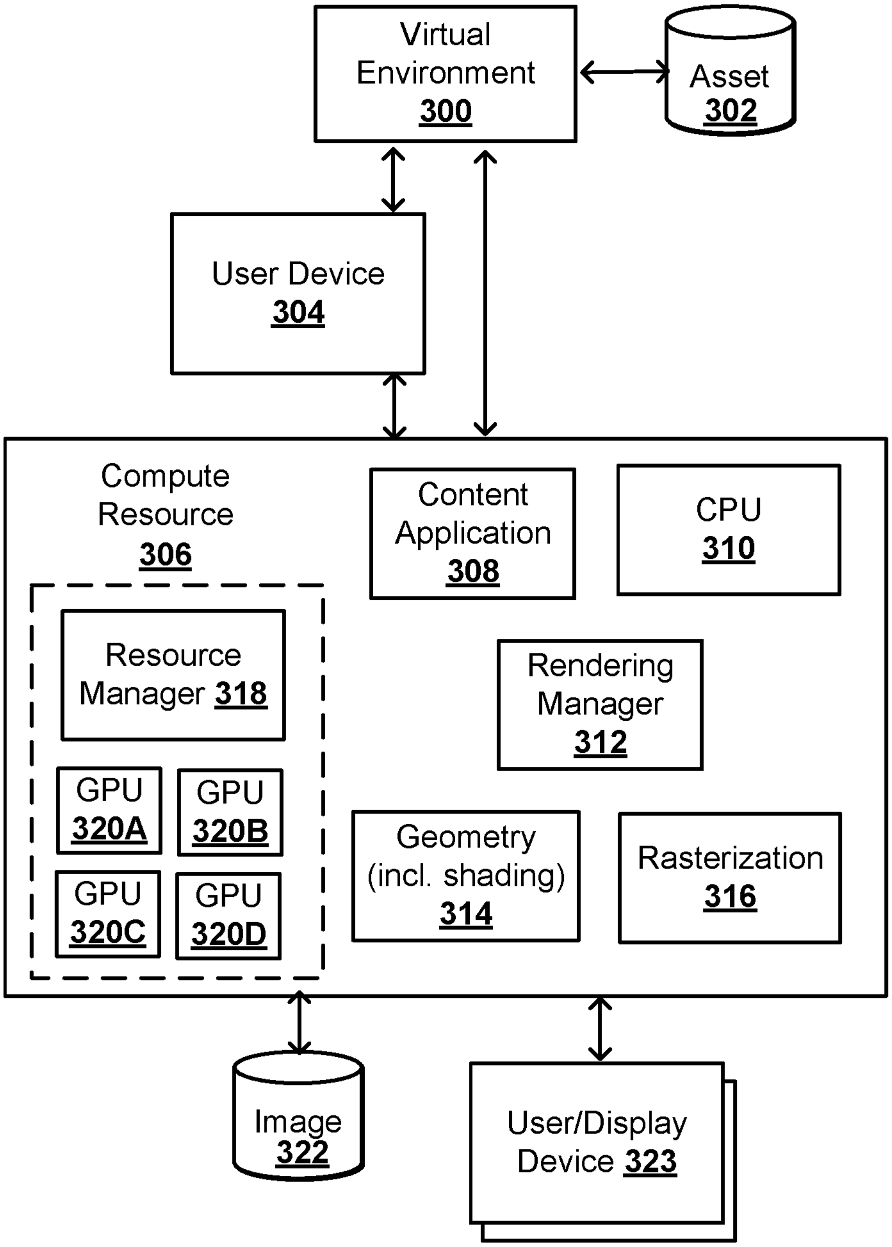
FIG. 3 illustrates components of an example content generation system, according to at least one embodiment.

FIG. 3 illustrates an example system for rendering an image, video frame, or other instance of image-related content in accordance with at least one embodiment. Such a system can include or incorporate functionality as presented herein to generate a representation of motion being performed by, for example, one or more virtual objects or assets. In this example, an image is to be rendered for a scene (or other view, portion, or region) in a virtual environment 300, although images can be rendered for semi-virtual or real environments as well using such a system. The virtual environment 300 may include geometry and other data representative of shapes or objects in the environment, such as three-dimensional (3D) objects that are representative, or are to be included in, a scene that occurs within the environment, as may include foreground objects such as people or vehicles, or background objects such as roads and buildings, among other such options. In at least some embodiments, at least some of the content to be inserted may be obtained from a source such as an asset repository 302, image repository 322, or other such location, which can contain content—such as geometry, textures, and density data—that can be used to render one or more objects placed into a view of the scene. In at least some embodiments or instances, there can be a user device 304 running a content generation or management application that can allow a user to select assets 302 and at least a relevant portion of the virtual environment 300 to use in rendering a composite image for the scene. The user device 304 can also allow a user to control aspects of the image to be rendered, such as the location or pose of an object in the scene, as well as a viewpoint and other parameters of a virtual camera to be used to render an image of the virtual environment 300. The rendered content may be displayed on the user device 304 or a separate user or display device 323, among other such options.

In this example, at least one compute resource 306 is used to perform the rendering. This resource may correspond to one or more servers, for example, that may be located locally or across at least one network, among other such options. In some embodiments, the rendering may instead be at least partially performed on the user device 304. The compute resource 306 may obtain or receive data to be used for the rendering, as may include geometry, texture, and density data for the virtual environment or assets, as well as information about the locations and poses of those objects in the scene and parameters of a virtual camera to be used to determine the view of the scene to be rendered. This information may be received to a content application 308, for example, that may be executing on a central processing unit (CPU) 310 of the compute resource that is responsible for tasks such as collecting data, causing an image to be rendered, and performing any formatting or encoding of a produced image, among other such operations. The content application can work with a rendering manager 312, for example, which can be responsible for coordinating operations of a rendering pipeline executing on the compute resource 306, as may include modules 314, 316 or processes responsible for tasks such as geometry related tasks (including lighting and shading tasks) and rasterization, among other such tasks. Offset determinations used to attempt to avoid self-intersections can account for errors, and be implemented in, these modules. In at least some embodiments, at least some rendering tasks may be performed using one or more GPUs 320A-D of the compute resource, as well as potentially one or more processors or compute instances (physical or virtual) of one or more other compute resources.

A task such as light transport simulation (e.g., ray tracing, path tracing, ray marching, etc.) or volumetric sampling can be performed using a single processor, such as a single GPU, or can have operations distributed across multiple GPUs 320A-D). In this example, there can be a pool or set of GPUs 320A-D, and a resource manager 318 can be at least partially responsible for allocating a GPU to perform the processing for an operation. If it is desired or beneficial to use more than one GPU then the resource manager 318 can allocate one or more GPUs having the appropriate capacity or capabilities. This can include allocating a number of GPUs indicated in a request, or determining a number of GPUs to allocate based in part on the request. In some embodiments, the resource manager may also be able to monitor an available bandwidth or memory in order to determine which and how many GPUs to allocate, such as where having high bandwidth capacity can allow operations to be spread across a greater number of GPUs, where bandwidth impact due to forwarding ray information will not be as critical, while having a bandwidth constrained system may cause the resource manager to attempt to allocate as few GPUs as possible in order to attempt to reduce the number of forwarding messages required.

In at least one embodiment, a partitioning of data can be performed by a rendering manager 312, for example, and the assigning of data to different processors can be performed by a resource manager 318 of the system. The resource manager can receive information from the rendering component, and can select appropriate processors from a pool of available processors 320 or processor capacity. In some embodiments, the rendering application can choose the partitioning, while in other embodiments the renderer may have no control over the data partitioning, which may be done by a separate management component (not illustrated in FIG. 3).

Figure 4:
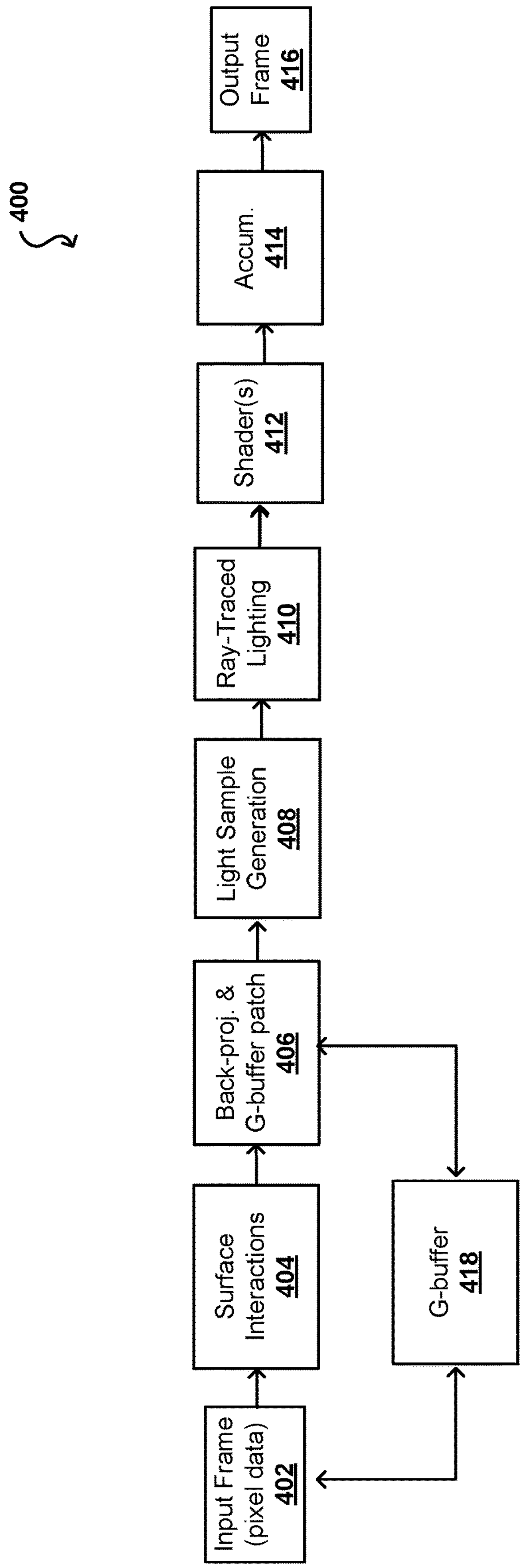
FIG. 4 illustrates components of an example rendering pipeline, according to at least one embodiment.

FIG. 4 illustrates an example image generation pipeline 400 that can be used in a system—such as that illustrated in FIG. 3—to render one or more images, such as video frames in a sequence. In this example, pixel data 402 for a current frame to be rendered (as may include G-buffer data for primary surfaces) can be received as input to a surface interactions component 404 of a rendering system. A surface interactions component 404 can use this data to attempt to determine data for any specific types of surface interactions (e.g., reflections, transmissions, diffractions, and/or refractions, etc.) in the pixel data, and can provide this data to a back-projection and G-buffer patching component 406, which can perform back-propagation as discussed herein to locate corresponding points for those surface interactions, and use this data to patch the G-buffer 418, which can provide updated input for a subsequent frame to be rendered. The data can then be provided to a light sample generation component 408 to perform light sampling, a ray-traced lighting component 410 to perform ray-traced lighting, and one or more shaders 412, which can set the pixel colors for the various pixels of the frame based at least in part upon the determined lighting information (along with other information such as color, texture, and so on). As mentioned, errors can be determined from the ray-traced lighting component 410 and/or shader 412 components that can be used to determine offset values for secondary ray spawn points. The results can be accumulated by an accumulation module 414 or component for generating an output frame 416 of a desired size, resolution, or format.

In at least one embodiment, a shader 412 can perform the backward projection step. Once a backward projection pass has finished, and gradient surface parameters have been patched into the current G-buffer, a renderer can execute the lighting passes. Using information from the lighting passes and the lighting results from the previous frame, gradients can be computed then filtered and used for history rejection. Such an approach can be used to compute robust temporal gradients between current and previous frames in a temporal denoiser for ray traced renderers. Such a backward projection-based approach can also work through surface interactions, and can work with rasterized G-buffers. Previous approaches for backward projection omitted any G-buffer patching and relied on the raw current G-buffer samples instead, which also results in false positive gradients. Patching the surface parameters can eliminate false positives in the vast majority of cases, making the denoised image very stable yet still quickly reacting to lighting changes. Once the backward projection pass is finished, and gradient surface parameters have been patched into the current G-buffer, a renderer can execute the lighting passes. Using the information from the lighting passes and the lighting results from the previous frame, the gradients are computed then filtered and used for history rejection. As discussed with respect to FIGS. 3A-3D, relighting and compositing of NeRF objects and non-NeRF objects can be placed at various location in such a pipeline, such as before or after ray-traced lighting component 410 is performed, or as part of an accumulation module 414, among other such options discussed or suggested herein.

In at least some embodiments, components of a rendering pipeline may use one or more machine learning (ML) models or deep neural networks (DNNs). This may include, for example, generative networks to generate image content. Machine learning can also be used in approaches to avoiding self-intersections with traced paths or rays, for example, such as where appropriate offsets or spawn locations are inferred based on multiple sources of error as discussed herein, to attempt to use an offset that is as small as possible (to provide accurate color and lighting information) while avoiding self-intersections or otherwise introducing image artifacts.

FIG. 5A illustrates a first example process 500 trace a second ray from an offset spawn point that can be performed in accordance with at least one embodiment. It should be understood that for this and other processes presented herein that there may be additional, fewer, or alternative steps performed or similar or alternative orders, or at least partially in parallel, within the scope of the various embodiments unless otherwise specifically stated. Further, although this example will be discussed with respect to first and second rays, there may be multiple rays traced from a sequence of hit points, and paths may be traced in place of rays, among other such variations, within the scope of various embodiments. In this example, a first ray is traced 502 for an image to be rendered of a scene. The scene can include one or more objects, with the objects having shapes in this example represented by triangles or other scene geometry. A hit point can be determined 504 where a first cast ray intersects scene geometry. It can then be determined 506 that there is to be a surface interaction (e.g., a reflection or a refraction) of the light, for example, such that a second ray is to be traced from that hit point. In order to attempt to avoid a self-intersection, for example, an offset distance can be calculated 508 for the second ray based in part upon two or more sources of numerical imprecision, such as errors experienced in a user shader or during ray traversal in ray tracing hardware or software. This offset value can be determined automatically, using a robust determination process that does not produce offset values that are too large or too small to avoid image artifacts. A spawn point can then be set 510 for the second ray at the offset distance from the hit point, along a surface normal of the scene geometry. The second ray can then be traced 512 from the spawn point. It can be determined 514 if there are other rays to be traced for this image to be rendered, and if so the process can continue with a next traced ray. If not, information (e.g., pixel-specific lighting information) corresponding to the traced rays can be provided 516 for use in rendering the image of the scene.

Figure 5B:
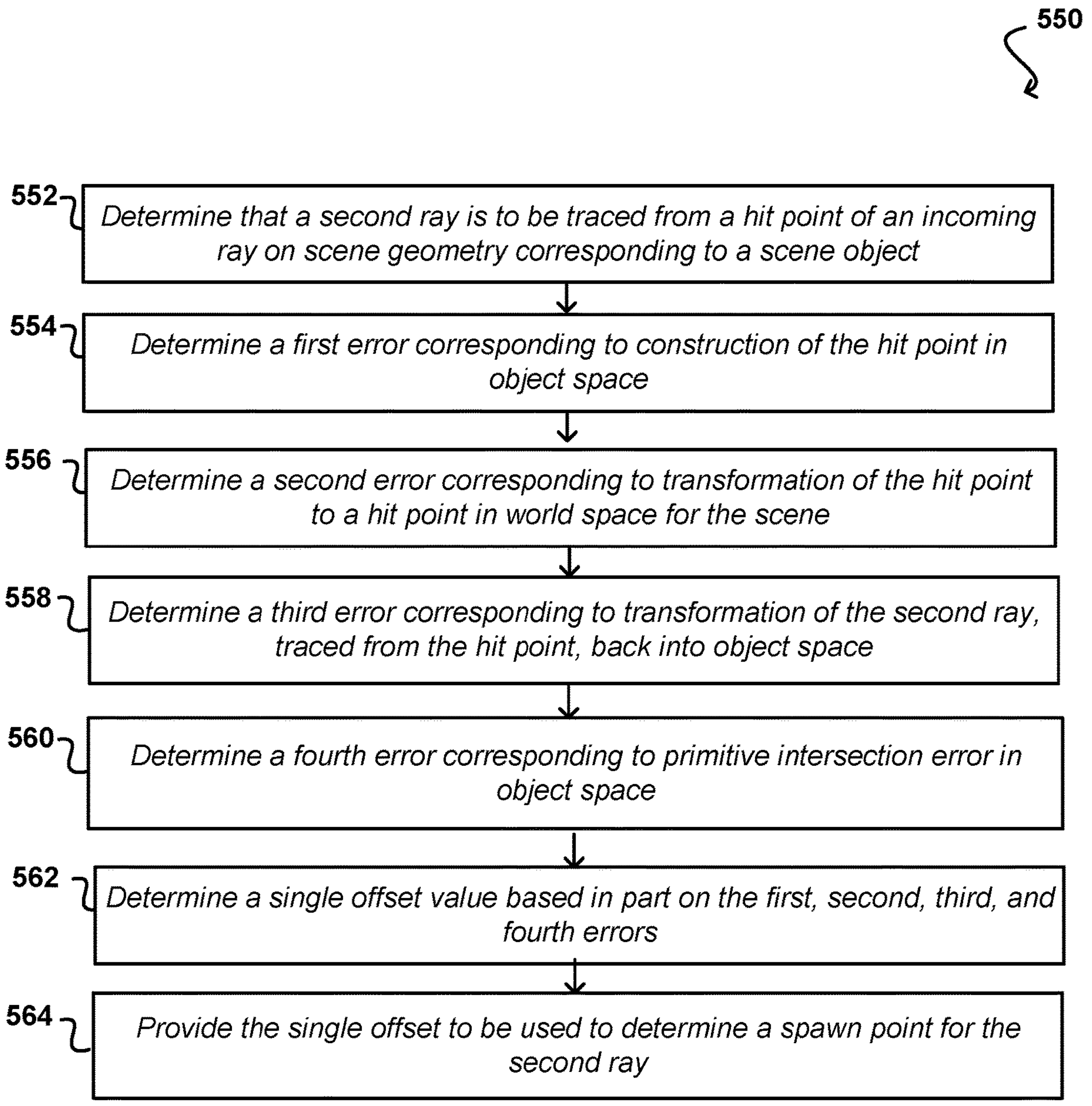

FIG. 5B illustrates an example process 550 for calculating an appropriate offset value that can be used in a process such as that described with respect to FIG. 5A. In this example, it is determined 552 that a second ray (or secondary ray) is to be traced from a hit point of an incoming ray on scene geometry corresponding to a scene object. This may be, for example, a hit point corresponding to an intersection with a triangle approximating the shape of the scene object, where that hit point is subject to at least some amount of precision error. In this example process, a number of error bounds will be determined that can be used to automatically determine an appropriate offset value. For example, a first error can be determined 554 that corresponds to the (re)construction of the hit point in object space. A second error can be determined 556 that corresponds to a transformation of this hit point in object space to a hit point in world space for the scene. A third error can be determined 558 that corresponds to a transformation of the ray, traced from the hit point, back into object space. A fourth error can be determined 560 that corresponds to the primitive intersection in object space. A single offset value can be determined 562 that is a function of the first, second, third, and fourth errors, such as may be a linear combination or scaled sum of these errors. This calculated single offset value can then be provided 564 to be used to determine a spawn point for the second ray to be traced. Such an approach can automatically determine an offset that can push the spawn point just outside of the overall error range for that hit point. The offset should be sufficient to handle various edge cases, such as where the hit point is near the edge of a triangle and the offset is sufficient to avoid intersection with an adjacent triangle of the same scene object. In at least one embodiment, the errors in object space are along an object space normal, and the error in world space is along a world space normal, and these two normals are related to each other by a transformation, such as the inverse transpose of the instance transform. The same offset value can be used whether the second ray is for a reflection, from a front surface of the scene geometry, or a refraction, from a back surface of the scene geometry. While the offset value is direction independent, the offset is dependent on the respective hit point and triangle, so in at least one embodiment an offset can be calculated for each hit point identified during ray tracing. If multiple rays are to be traced from a hit point to multiple light sources or cameras, such as for shadow rays and determinations, however, the same offset values can be used for each of those secondary rays.

In at least one embodiment, the content to be rendered is not limited to a single image, but can include, or correspond to, various types of representations of one or more objects in a scene or environment. For example, the rendered content can include video frames, streaming media, or multidimensional object representations, such as may be useful for various operations, including—but not limited to—those related to gaming, animation, simulation, autonomous navigation, or virtual reality (VR)/augmented reality (AR)/enhanced reality (ER) applications, among other such options.

Aspects of various approaches presented herein can be lightweight enough to execute in various locations, such as on a device such as a client device that include a personal computer or gaming console, in real time. Such processing can be performed on, or for, content that is generated on, or received by, that client device or received from an external source, such as streaming data or other content received over at least one network from a cloud server 620 or third party service 660, among other such options. In some instances, at least a portion of the processing, generation, compositing, and/or determination of this content may be performed by one of these other devices, systems, or entities, then provided to the client device (or another such recipient) for presentation or another such use.

Figure 6:
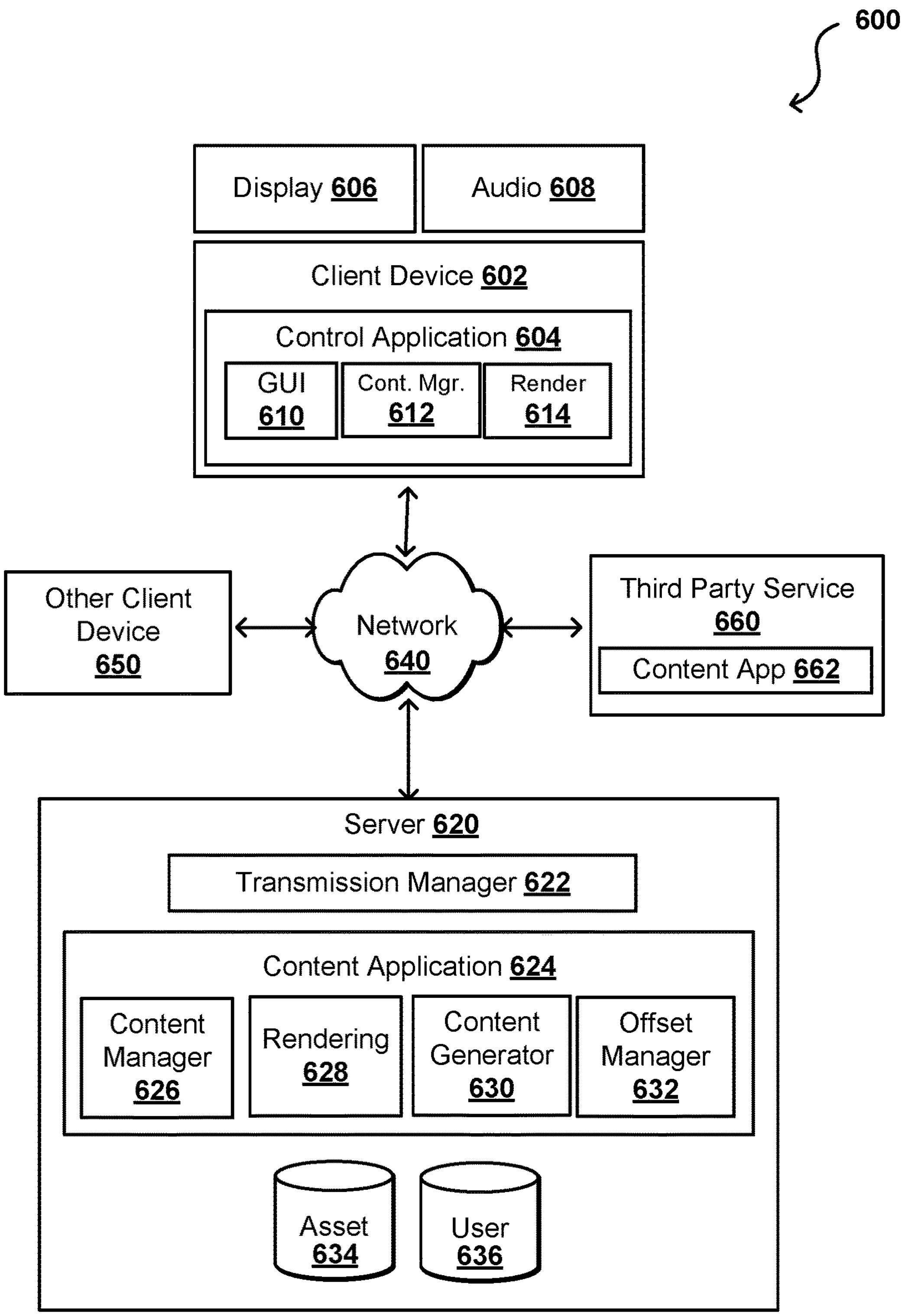
FIG. 6 illustrates components of a distributed system that can be utilized to generate and provide image content, according to at least one embodiment.

As an example, FIG. 6 illustrates an example network configuration 600 that can be used to provide, generate, modify, encode, process, and/or transmit image data or other such content. In at least one embodiment, a client device 602 can generate or receive data for a session using components of a content application 604 on client device 602 and data stored locally on that client device. In at least one embodiment, a content application 624 executing on a server 620 (e.g., a cloud server or edge server) may initiate a session associated with at least one client device 602, as may utilize a session manager and user data stored in a user database 636, and can cause content such as one or more digital assets (e.g., implicit and/or explicit object representations) from an asset repository 634 to be determined by a content manager 626. A content manager 626 may work with a rendering module 628 to generate or select objects, digital assets, or other such content to be placed in a scene or other virtual environment. Views of these objects can be rendered by the rendering module 628, and provided for presentation via the client device 602. In at least one embodiment, this rendering module 628 can work with a content generator 630 that may determine image content to be rendered by the rendering module 628 as part of a content offering. As mentioned, an offset manager 632 may be used, separately or as part of the rendering module 628 or a ray tracing module, to determine offset values to use for secondary rays to avoid artifacts resulting from self-intersections. At least a portion of the rendered content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding content application 604, which may also or alternatively include a graphical user interface 610, content manager 612, and rendering module 614 for use in providing, synthesizing, rendering, compositing, modifying, or using content for presentation (or other purposes) on or by the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
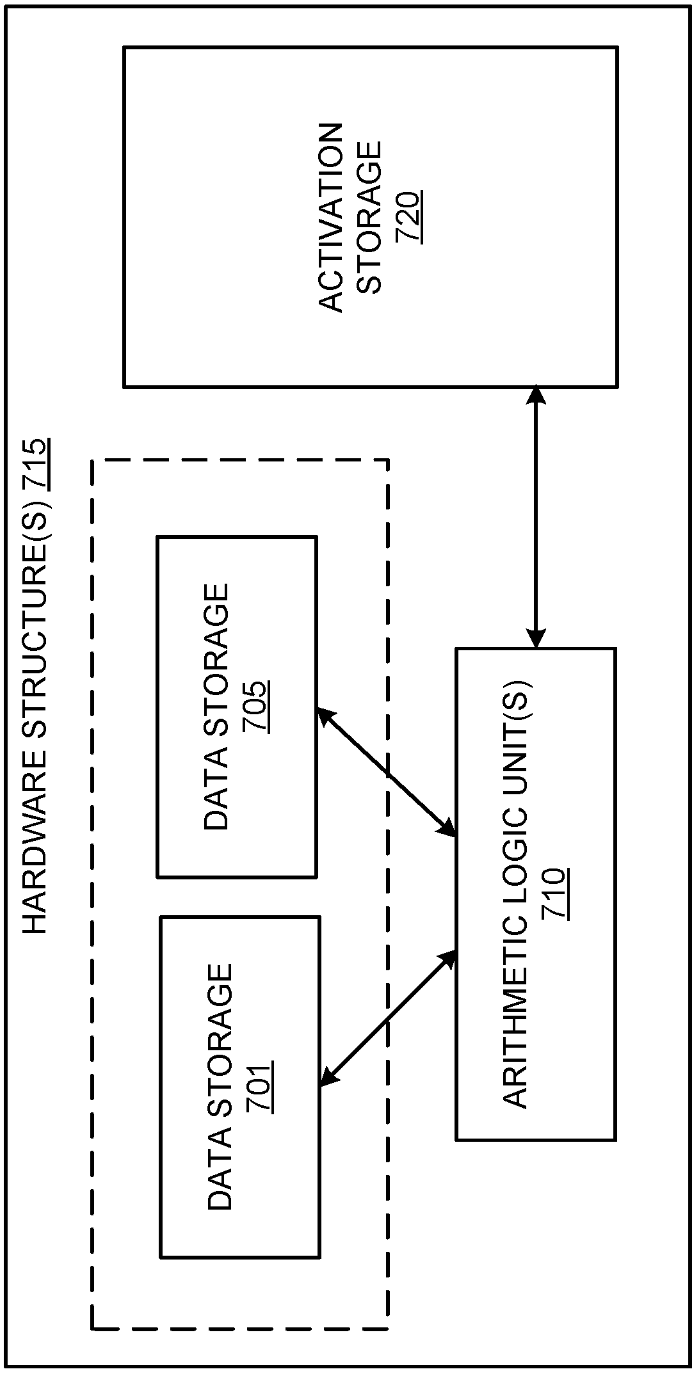
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 701 and/or code and/or data storage 705 are used as operands along with other values, such as bias values, gradient information, momentum values, or other parameters or hyperparameters, any or all of which may be stored in code and/or data storage 701 or code and/or data storage 705 or another storage on or off-chip.

In at least one embodiment, ALU(s) 710 are included within one or more processors or other hardware logic devices or circuits, whereas in another embodiment, ALU(s)

710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
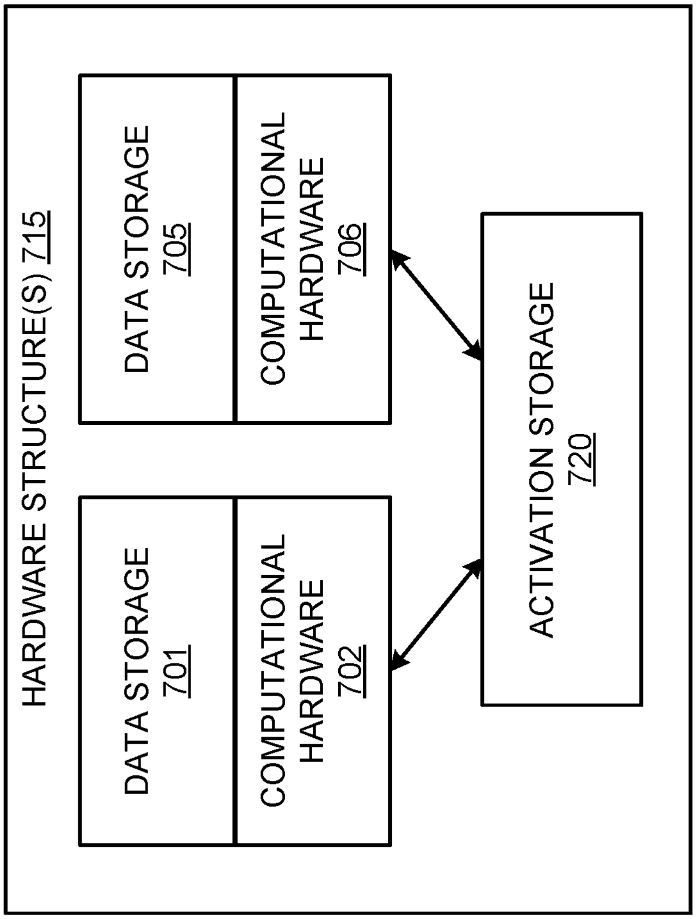
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
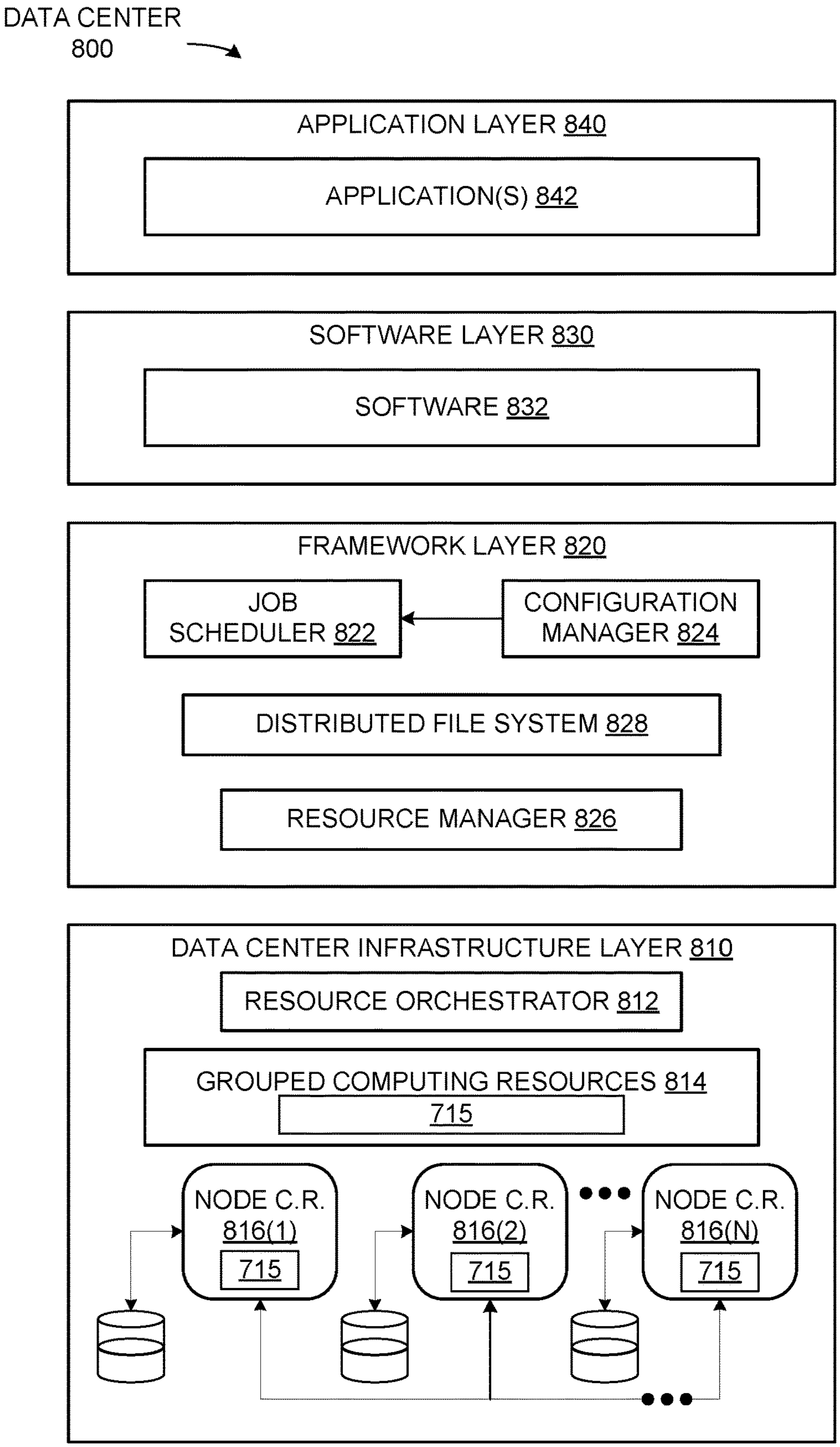
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to render objects of different types, determine consistent secondary lighting effects for those objects, then composite the objects using the secondary lighting effects to generate composite images.

Computer Systems

Figure 9:
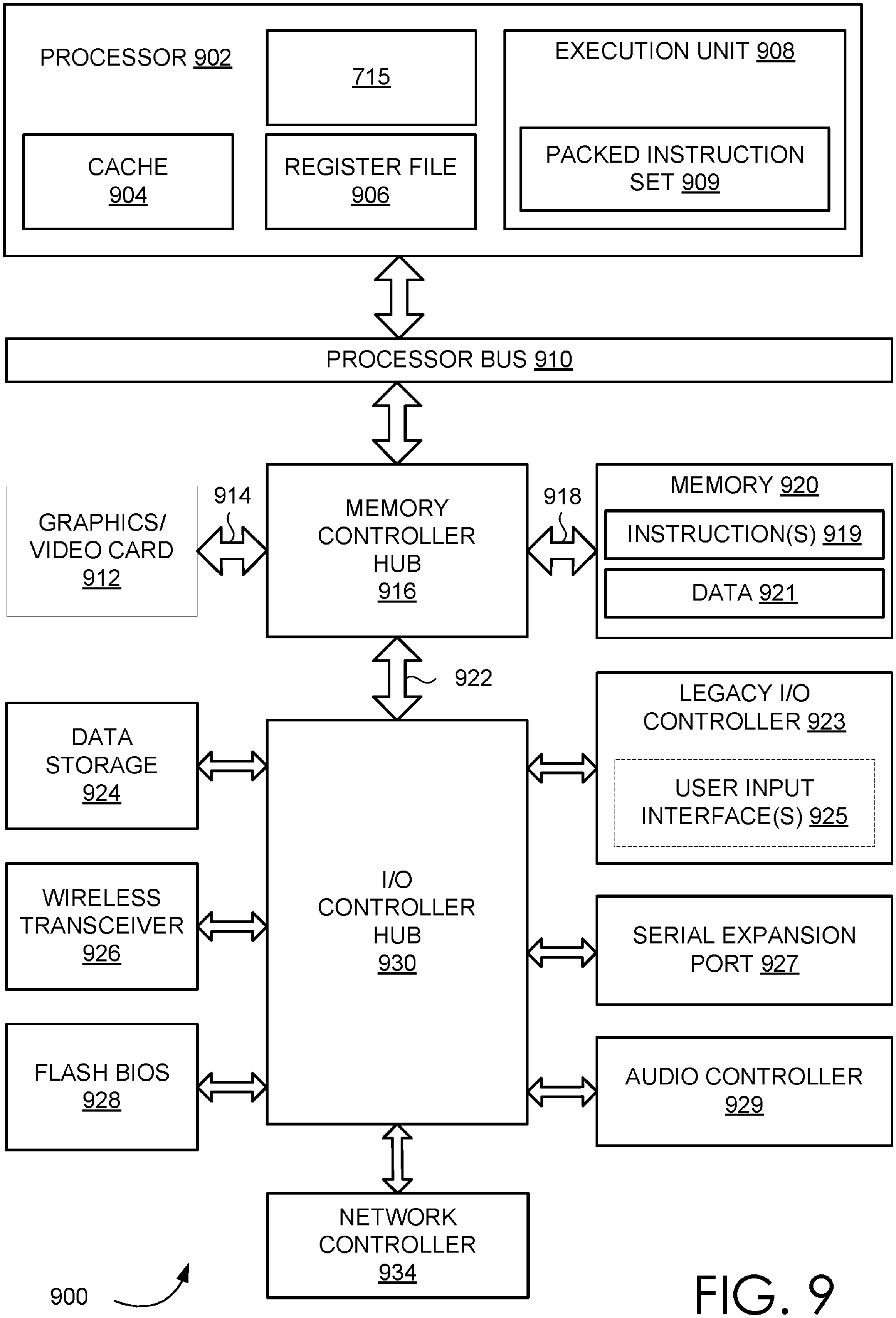
FIG. 9 illustrates a computer system, according to at least one embodiment.

FIG. 9 is a block diagram illustrating an exemplary computer system 900, which may be a system with interconnected devices and components, a system-on-a-chip (SOC) or some combination thereof formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution unit(s) 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word computing ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache 904 may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit(s) 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit(s) 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor data bus 910 for performing operations on packed data, which may eliminate need to transfer smaller units of data across processor data bus 910 to perform one or more operations one data element at a time.

In at least one embodiment, execution unit(s) 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interface(s) 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to render objects of different types, determine consistent secondary lighting effects for those objects, then composite the objects using the secondary lighting effects to generate composite images.

Figure 10:
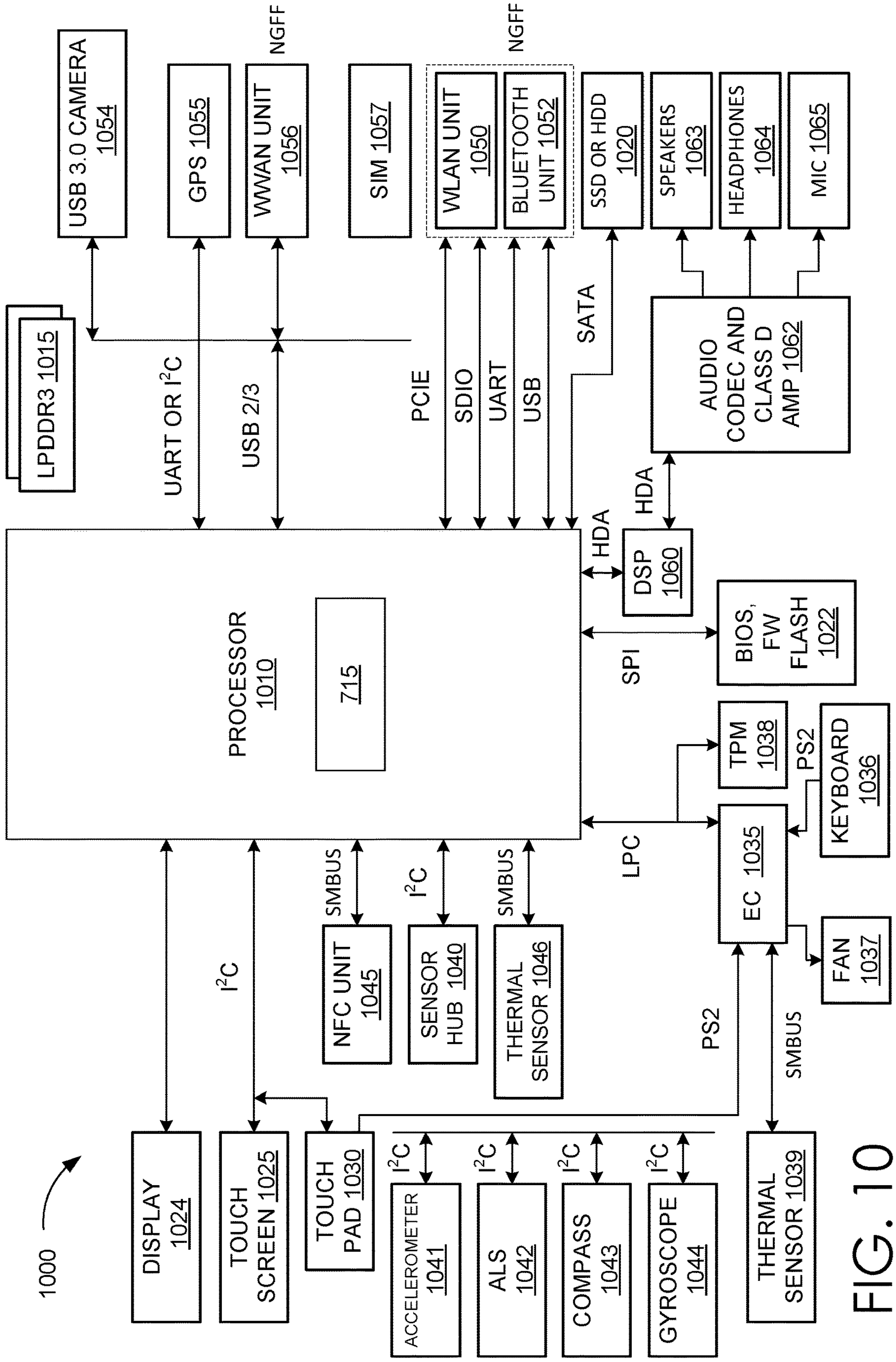
FIG. 10 illustrates a computer system, according to at least one embodiment.

FIG. 10 is a block diagram illustrating an electronic device 1000 for using a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates an electronic device 1000, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to render objects of different types, determine consistent secondary lighting effects for those objects, then composite the objects using the secondary lighting effects to generate composite images.

Figure 11:
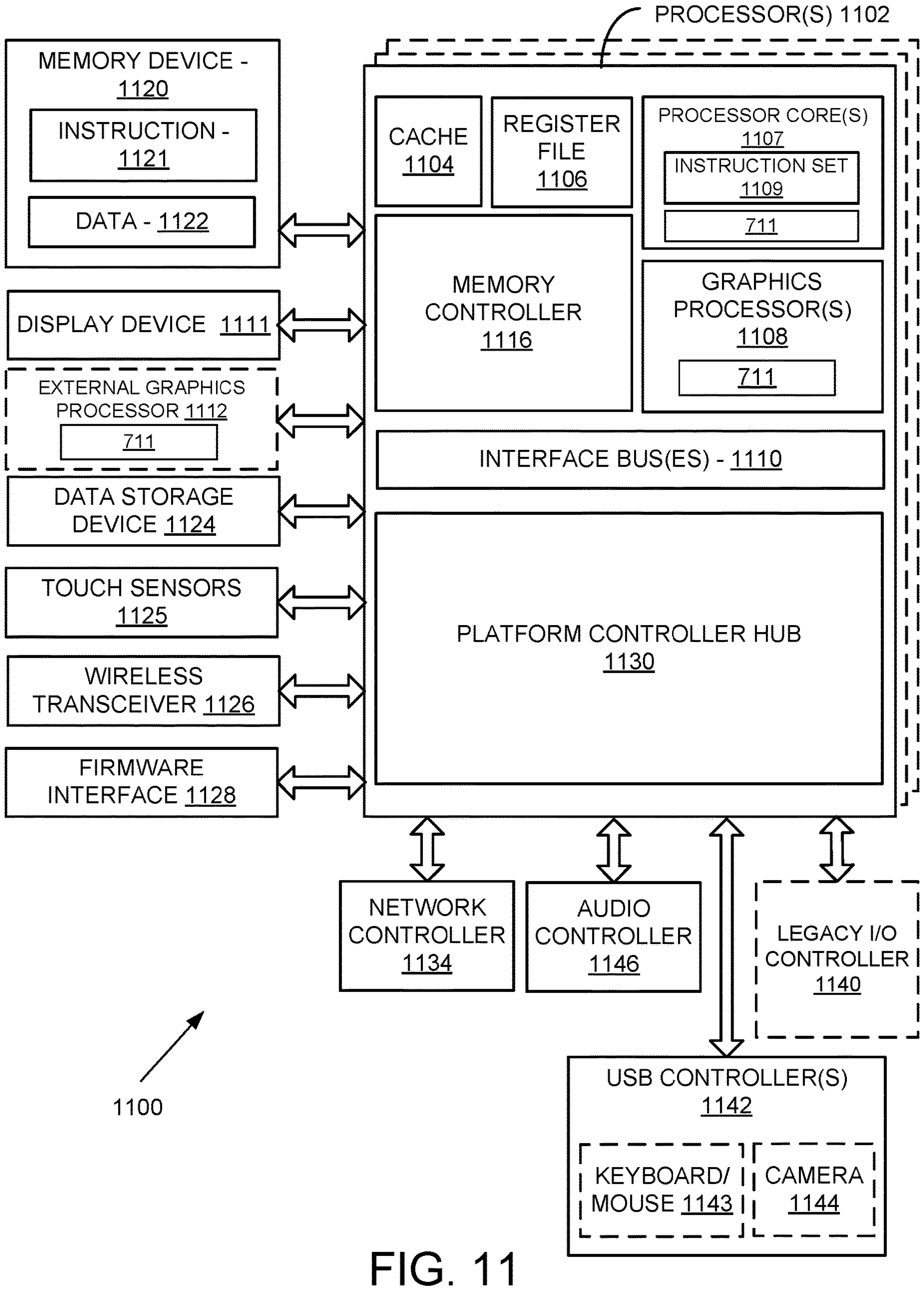
FIG. 11 illustrates at least portions of a graphics processor, according to one or more embodiments.

FIG. 11 is a block diagram of a processing system, according to at least one embodiment. In at least one embodiment, processing system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, processing system 1100 is a processing platform incorporated within a system-on-a-chip (SoC) integrated circuit for use in mobile, handheld, or embedded devices.

In at least one embodiment, processing system 1100 can include, or be incorporated within a server-based gaming platform, a game console, including a game and media console, a mobile gaming console, a handheld game console, or an online game console. In at least one embodiment, processing system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, augmented reality device, or virtual reality device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor core(s) 1107 may each process a different instruction set 1109, which may include instructions to facilitate emulation of other instruction sets. In at least one embodiment, processor core(s) 1107 may also include other processing devices, such a Digital Signal Processor (DSP).

In at least one embodiment, processor(s) 1102 includes cache memory ("cache") 1104. In at least one embodiment, processor(s) 1102 can have a single internal cache or multiple levels of internal cache. In at least one embodiment, cache 1104 is shared among various components of processor(s) 1102. In at least one embodiment, processor(s) 1102 also uses an external cache (e.g., a Level-3 (L3) cache or Last Level Cache (LLC)) (not shown), which may be shared among processor core(s) 1107 using known cache coherency techniques. In at least one embodiment, register file 1106 is additionally included in processor(s) 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in processing system 1100. In at least one embodiment, interface bus(es) 1110, in one embodiment, can be a processor bus, such as a version of a Direct Media Interface (DMI) bus. In at least one embodiment, interface bus(es) 1110 is not limited to a DMI bus, and may include one or more Peripheral Component Interconnect buses (e.g., PCI, PCI Express), memory buses, or other types of interface buses. In at least one embodiment processor(s) 1102 include an integrated memory controller 1116 and a platform controller hub 1130. In at least one embodiment, memory controller 1116 facilitates communication between a memory device 1120 and other components of processing system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for processing system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 allows peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 allows communication with system firmware, and can be, for example, a unified extensible firmware interface (UEFI). In at least one embodiment, network controller 1134 can allow a network connection to a wired network. In at least one embodiment, a high-performance network controller (not shown) couples with interface bus(es) 1110. In at least one embodiment, audio controller 1146 is a multi-channel high definition audio controller. In at least one embodiment, processing system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controller(s) 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, processing system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processing system 1100. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to render objects of different types, determine consistent secondary lighting effects for those objects, then composite the objects using the secondary lighting effects to generate composite images.

Figure 12:
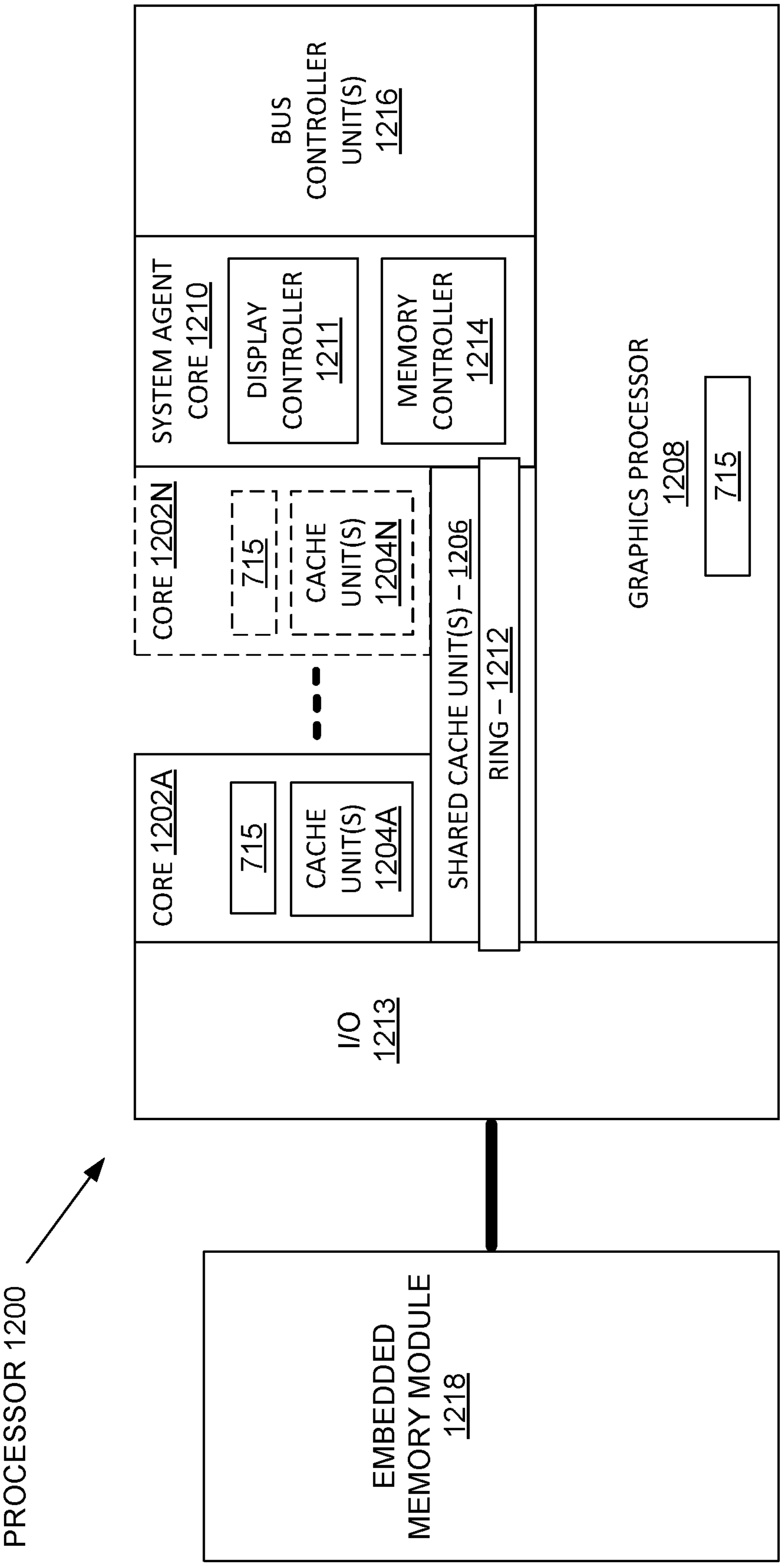
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core(s) 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache memory unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express buses. In at least one embodiment, system agent core 1210 provides management functionality for various processor components. In at least one embodiment, system agent core 1210 includes one or more integrated memory controller(s) 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit (PCU), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controller(s) 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory module 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture (ISA), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to render objects of different types, determine consistent secondary lighting effects for those objects, then composite the objects using the secondary lighting effects to generate composite images.

Virtualized Computing Platform

Figure 13:
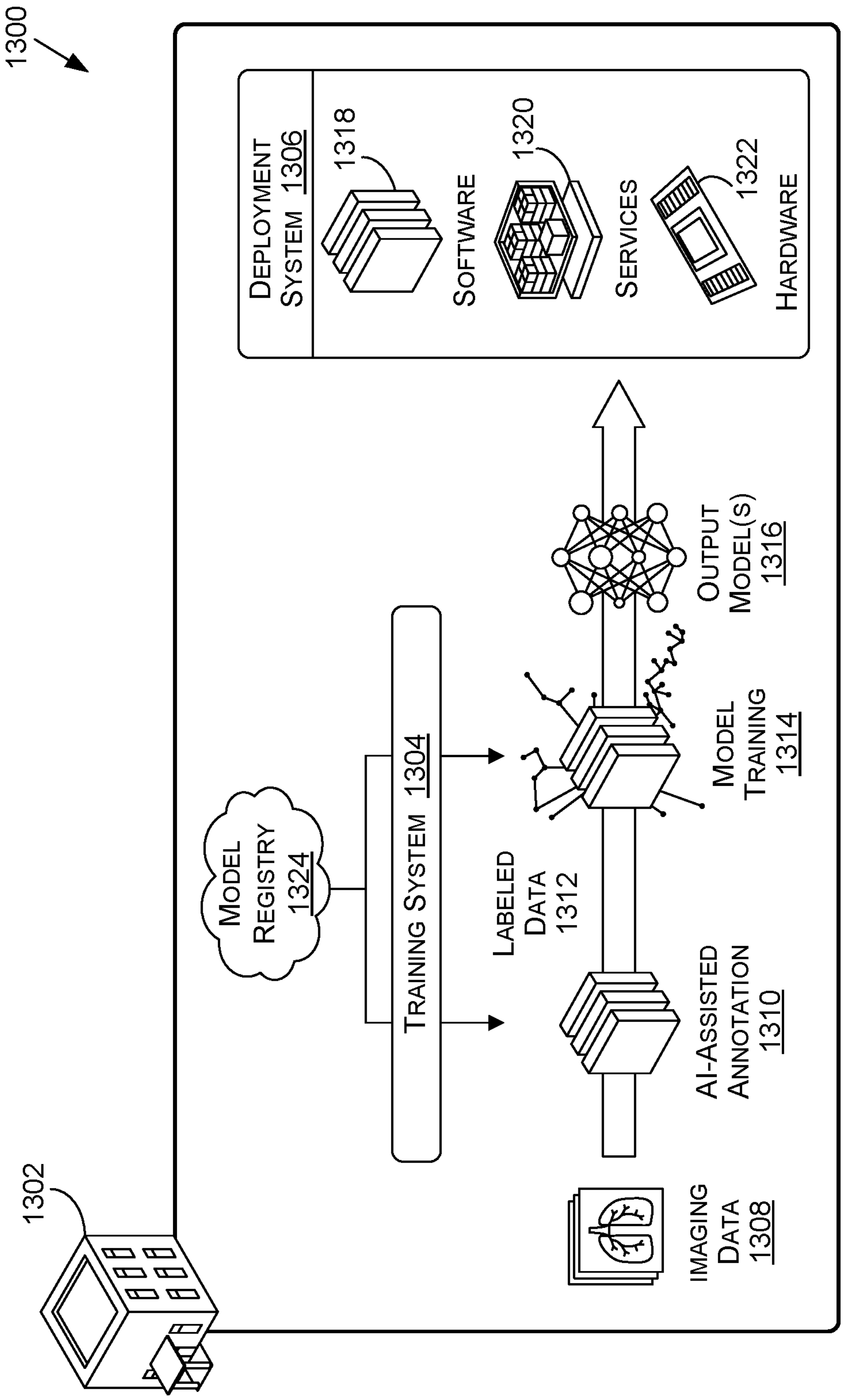
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facility(ies) 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility(ies) 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility(ies) 1302 using data 1308 (such as imaging data) generated at facility(ies) 1302 (and stored on one or more picture archiving and communication system (PACS) servers at facility(ies) 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility(ies) 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility(ies) 1302 needs a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility(ies) 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility(ies) 1302 requiring a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility(ies) 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotation 1310, labeled data 1312, or a combination thereof—may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility(ies) 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., processor 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by process 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., process 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform). In at least one embodiment, rather than each application that shares a same functionality offered by services 1320 being required to have a respective instance of services 1320, services 1320 may be shared between and among various applications. In at least one embodiment, services 1320 may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a services 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility(ies) 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to allow seamless scaling and load balancing.

Figure 14:
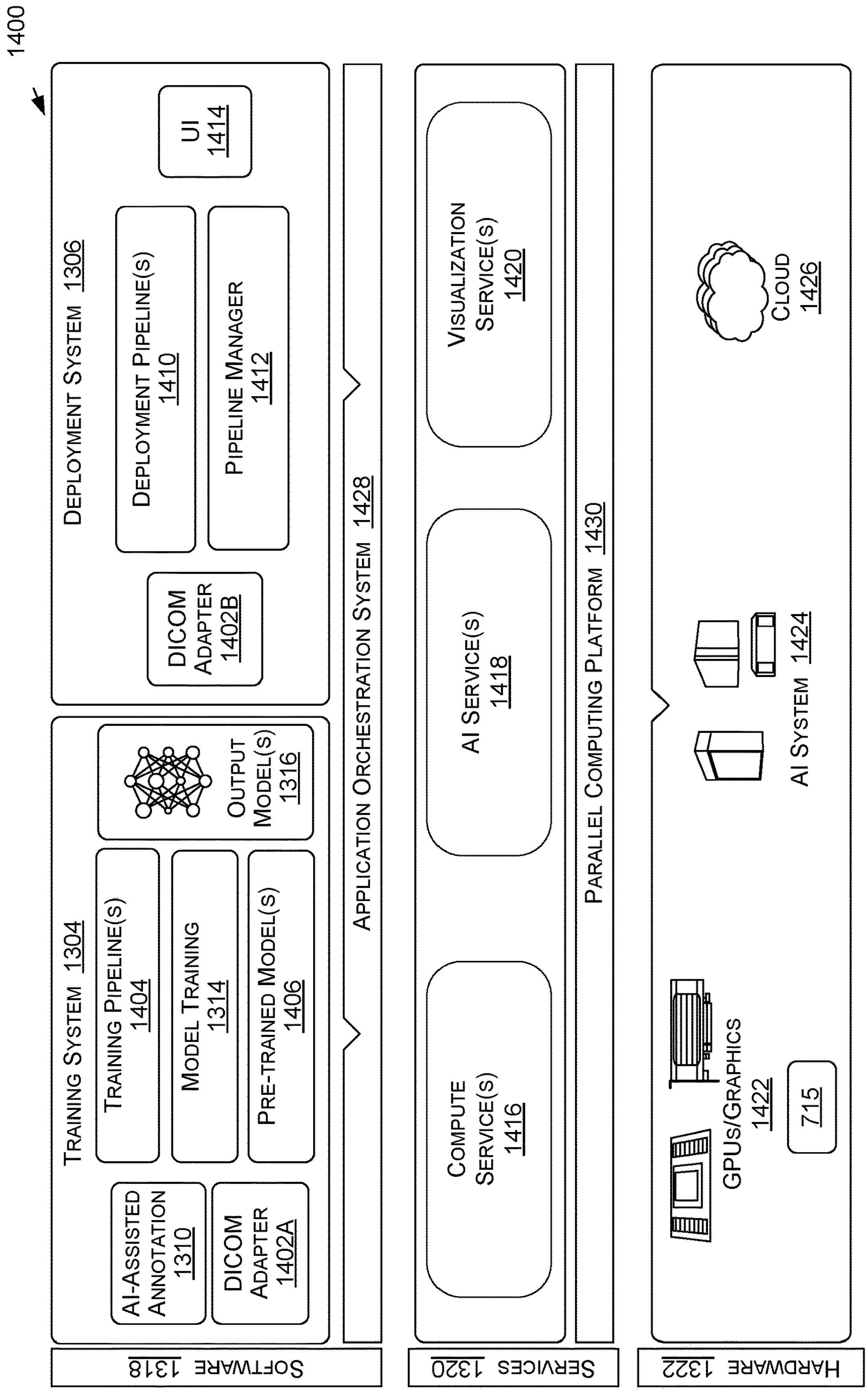
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipeline(s) 1404, similar to those described herein with respect to FIG. 13. In at least one embodiment, where one or more machine learning models are to be used in deployment pipeline(s) 1410 by deployment system 1306, training pipeline(s) 1404 may be used to train or retrain one or more (e.g. pre-trained) models, and/or implement one or more of pre-trained model(s) 1406 (e.g., without a need for retraining or updating). In at least one embodiment, as a result of training pipeline(s) 1404, output model(s) 1316 may be generated. In at least one embodiment, training pipeline(s) 1404 may include any number of processing steps, such as but not limited to imaging data (or other input data) conversion or adaption In at least one embodiment, for different machine learning models used by deployment system 1306, different training pipeline(s) 1404 may be used. In at least one embodiment, training pipeline(s) 1404 similar to a first example described with respect to FIG. 13 may be used for a first machine learning model, training pipeline(s) 1404 similar to a second example described with respect to FIG. 13 may be used for a second machine learning model, and training pipeline(s) 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipeline(s) 1404 may include AI-assisted annotation, as described in more detail herein with respect to at least FIG. 14. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation 1310 may be performed as part of deployment pipelines 1410; either in addition to, or in lieu of AI-assisted annotation 1310 included in training pipeline(s) 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility(ies) 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (e.g., execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may allow general purpose computing on GPUs (GPGPU) (e.g., GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (e.g., tasked with performing one or more processing tasks of an application). In at least one embodiment, AI service(s) 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1420 may include an internal visualizer, cinematics, and/or other rendering or image processing capabilities or functionality (e.g., ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (e.g., NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs/Graphics 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to allow seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
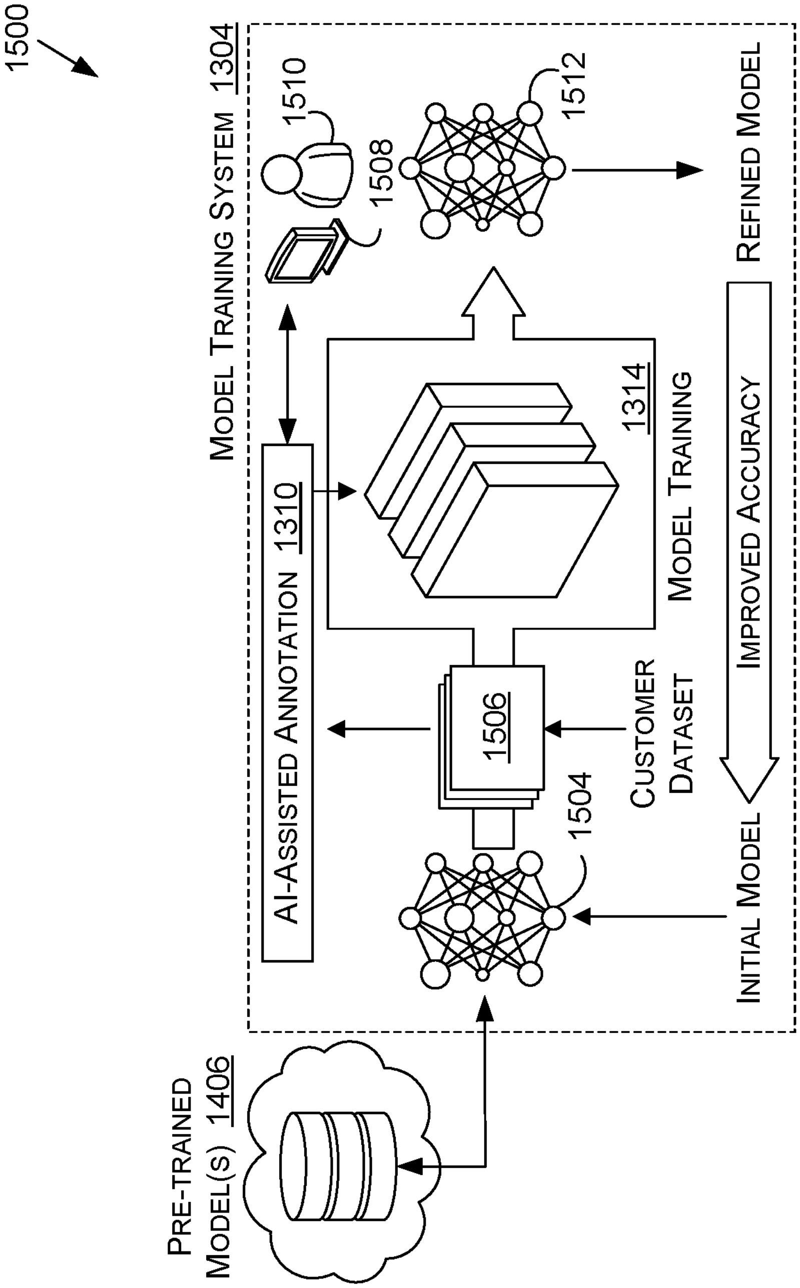
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined model 1512 generated by process 1500 may be executed by a deployment system for one or more containerized applications in deployment pipelines 1510.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained model(s) 1506 may be stored in a data store, or registry. In at least one embodiment, pre-trained model(s) 1506 may have been trained, at least in part, at one or more facilities other than a facility executing process 1500. In at least one embodiment, to protect privacy and rights of patients, subjects, or clients of different facilities, pre-trained model(s) 1506 may have been trained, on-premise, using customer or patient data generated on-premise. In at least one embodiment, pre-trained model(s) 1506 may be trained using a cloud and/or other hardware, but confidential, privacy protected patient data may not be transferred to, used by, or accessible to any components of a cloud (or other off premise hardware). In at least one embodiment, where pre-trained model(s) 1506 is trained at using patient data from more than one facility, pre-trained model(s) 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model(s) 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select pre-trained model(s) 1506 to use with an application. In at least one embodiment, pre-trained model(s) 1506 may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model(s) 1506 may be updated, retrained, and/or fine-tuned for use at a respective facility.

In at least one embodiment, a user may select pre-trained model(s) 1506 that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by model training system 1304. In at least one embodiment, ground truth data may be generated, at least in part, by clinicians, scientists, doctors, practitioners, at a facility.

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, this process may be completed at any number of facilities such that refined model 1512 may be further refined on new datasets any number of times to generate a more universal model.

Figure 15B:
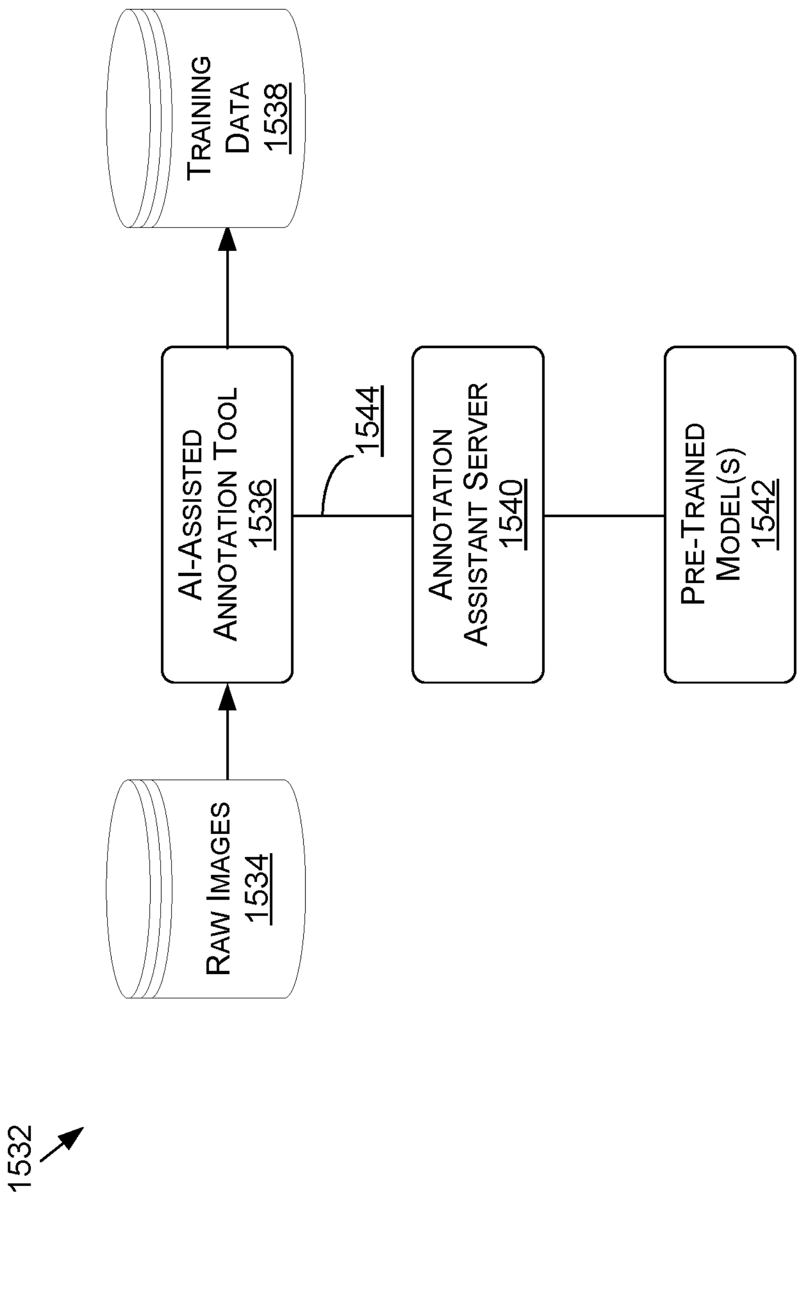

FIG. 15B is an example illustration of a client-server architecture 1532 to enhance annotation tools with pre-trained annotation model(s) 1542, in accordance with at least one embodiment. In at least one embodiment, AI-assisted annotation tool 1536 may be instantiated based on a client-server architecture 1532. In at least one embodiment, AI-assisted annotation tool 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (e.g., API Call 1544) to a server, such as an annotation assistant server 1540 that may include a set of pre-trained model(s) 1542 stored in an annotation model registry, for example. In at least one embodiment, an annotation model registry may store pre-trained model(s) 1542 (e.g., machine learning models, such as deep learning models) that are pre-trained to perform AI-assisted annotation 1310 on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:

determining, based in part on an intersection of a primary ray with scene geometry for an image to be rendered, that a secondary ray is to be traced from a location of the intersection;

calculating an offset distance based in part on two or more sources of numerical imprecision;

setting a spawn point for the secondary ray at the offset distance from the intersection along a normal of the scene geometry; and tracing the secondary ray from the spawn point.

2. The computer-implemented method of clause 1, wherein the scene geometry includes a triangle of a set of triangles approximating a surface of an object to be represented in the image.

3. The computer-implemented method of clause 2, wherein the two or more sources of numerical imprecision include at least one source in object space associated with the object to be represented in the image, and at least one source in world space associated with an environment in which the scene geometry is located.

4. The computer-implemented method of clause 1, wherein the two or more sources of numerical imprecision include at least an object space hit test bounding error, an object space hit reconstruction error, a world space error bound on an object-to-world space transformation, or a world-to-object space transformation error.

5. The computer-implemented method of clause 1, further comprising:

normalizing one or more coordinates in world space before performing a world-to-object space transformation.

6. The computer-implemented method of clause 1, wherein the intersection of the primary ray with the scene geometry is calculated using two-dimensional barycentric hit coordinates.

7. The computer-implemented method of clause 1, wherein the offset distance is able to be applied in either direction along the normal of the scene geometry to provide for surface interactions of traced rays with respect to the scene geometry.

8. The computer-implemented method of clause 1, wherein the offset distance is selected to avoid a self-intersection of the secondary ray with the intersected scene geometry due in part to numerical imprecision corresponding to the location of the intersection of the primary ray with the scene geometry.

9. The computer-implemented method of clause 1, wherein the location of the intersection is determined using interpolation of vertices of the scene geometry.

10. A processor, comprising:

one or more circuits to:

determine a location of a spawn point for a ray with respect to scene geometry;

calculate an offset based in part on two or more sources of numerical imprecision associated with the location; and trace the ray from the spawn point as separated from the determined location by the offset along a surface normal of the scene geometry.

11. The processor of clause 10, wherein the spawn point corresponds to an intersection point of an incoming ray with the scene geometry.

12. The processor of clause 11, wherein the two or more sources of numerical imprecision include at least one source in object space, associated with the object to be represented in the image, and at least one source in world space, associated with an environment in which the scene geometry is located.

13. The processor of clause 10, wherein the two or more sources of numerical imprecision include at least an object space hit test bounding error, an object space hit reconstruction error, a world space error bound on an object-to-world space transformation, or a world-to-object space transformation error.

14. The processor of clause 13, wherein the one or more circuits are further to:

normalize one or more coordinates in world space before performing the world-to-object space transformation.

15. The processor of clause 10, wherein the processor is comprised in at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a system for performing generative AI operations using a large language model (LLM), a collaborative content creation platform for 3D assets; or a system implemented at least partially using cloud computing resources.

16. A system, comprising:

one or more processors to avoid self-intersection of a second ray with scene geometry by, in part, determining an intersection point of a first ray with the scene geometry, and offsetting a spawn point for the second ray by an offset amount from the intersection point along a surface normal of the scene geometry, the offset amount calculated using two or more sources of numerical imprecision associated with the intersection point.

17. The system of clause 16, wherein the scene geometry includes a triangle of a set of triangles approximating a surface of an object to be represented in the image.

18. The system of clause 16, wherein the two or more sources of numerical imprecision include at least one source in object space associated with the object to be represented in the image, and at least one source in world space associated with an environment in which the scene geometry is located.

19. The system of clause 16, wherein the two or more sources of numerical imprecision include at least an object space hit test bounding error, an object space hit reconstruction error, a world space error bound on an object-to-world space transformation, or a world-to-object space transformation error.

20. The system of clause 16, wherein the system comprises at least one of:

a system for performing simulation operations;

a system for performing simulation operations to test or validate autonomous machine applications;

- a system for performing digital twin operations;
- a system for performing light transport simulation;
- a system for rendering graphical output;
- a system for performing deep learning operations;
- a system for performing generative AI operations using a large language model (LLM),
- a system implemented using an edge device;
- a system for generating or presenting virtual reality (VR) content;
- a system for generating or presenting augmented reality (AR) content;
- a system for generating or presenting mixed reality (MR) content;
- a system incorporating one or more Virtual Machines (VMs);
- a system implemented at least partially in a data center;
- a system for performing hardware testing using simulation;
- a system for synthetic data generation;
- a collaborative content creation platform for 3D assets; or
- a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:

determining, based in part on an intersection of a primary ray with scene geometry for an image to be rendered, that a secondary ray is to be traced from a location of the intersection;

calculating an offset distance based in part on two or more sources of numerical imprecision;

setting a spawn point for the secondary ray at the offset distance from the intersection along a normal of the scene geometry; and tracing the secondary ray from the spawn point.

2. The computer-implemented method of claim 1, wherein the scene geometry includes a triangle of a set of triangles approximating a surface of an object to be represented in the image.

3. The computer-implemented method of claim 2, wherein the two or more sources of numerical imprecision include at least one source in object space associated with the object to be represented in the image, and at least one source in world space associated with an environment in which the scene geometry is located.

4. The computer-implemented method of claim 1, wherein the two or more sources of numerical imprecision include at least one source in object space comprising a hit test bounding error or a hit reconstruction error, and at least one source in world space comprising an error bound on an object-to-world space transformation or a world-to-object space transformation error.

5. The computer-implemented method of claim 1, further comprising:

normalizing one or more coordinates in world space before performing a world-to-object space transformation.

6. The computer-implemented method of claim 1, wherein the intersection of the primary ray with the scene geometry is calculated using two-dimensional barycentric hit coordinates.

7. The computer-implemented method of claim 1, wherein the offset distance is able to be applied in either direction along the normal of the scene geometry to provide for surface interactions of traced rays with respect to the scene geometry.

8. The computer-implemented method of claim 1, wherein the offset distance is selected to avoid a self-intersection of the secondary ray with the intersected scene geometry due in part to numerical imprecision corresponding to the location of the intersection of the primary ray with the scene geometry.

9. The computer-implemented method of claim 1, wherein the location of the intersection is determined using interpolation of vertices of the scene geometry.

10. A processor, comprising:

one or more circuits to:

determine a location of a spawn point for a ray with respect to scene geometry;

calculate an offset based in part on two or more sources of numerical imprecision associated with the location; and trace the ray from the spawn point as separated from the determined location by the offset along a surface normal of the scene geometry.

11. The processor of claim 10, wherein the spawn point corresponds to an intersection point of an incoming ray with the scene geometry.

12. The processor of claim 11, wherein the two or more sources of numerical imprecision include at least one source in object space, associated with the object to be represented in the image, and at least one source in world space, associated with an environment in which the scene geometry is located.

13. The processor of claim 10, wherein the two or more sources of numerical imprecision include at least an object space hit test bounding error, an object space hit reconstruction error, a world space error bound on an object-to-world space transformation, or a world-to-object space transformation error.

14. The processor of claim 13, wherein the one or more circuits are further to:

normalize one or more coordinates in world space before performing the world-to-object space transformation.

15. The processor of claim 10, wherein the processor is comprised in at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a system for performing generative AI operations using a large language model (LLM), a collaborative content creation platform for 3D assets; or a system implemented at least partially using cloud computing resources.

16. A system, comprising:

one or more processors to avoid self-intersection of a second ray with scene geometry by, in part, determining an intersection point of a first ray with the scene geometry, and offsetting a spawn point for the second ray by an offset amount from the intersection point along a surface normal of the scene geometry, the offset amount calculated using two or more sources of numerical imprecision associated with the intersection point.

17. The system of claim 16, wherein the scene geometry includes a triangle of a set of triangles approximating a surface of an object to be represented in the image.

18. The system of claim 16, wherein the two or more sources of numerical imprecision include at least one source in object space associated with the object to be represented in the image, and at least one source in world space associated with an environment in which the scene geometry is located.

19. The system of claim 16, wherein the two or more sources of numerical imprecision include at least an object space hit test bounding error, an object space hit reconstruction error, a world space error bound on an object-to-world space transformation, or a world-to-object space transformation error.

20. The system of claim 16, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system for performing generative AI operations using a large language model (LLM), a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

* * * * *